United States Patent [19]

Wakatake

[11] Patent Number: 5,363,237
[45] Date of Patent: * Nov. 8, 1994

[54] PSEUDO-LUMINOUS PANEL, SUBSTRATE THEREFOR, AND DISPLAY ELEMENT AND DEVICE USING THE PSEUDO-LUMINOUS PANEL

[75] Inventor: Yoshimasa Wakatake, Tokyo, Japan

[73] Assignee: Masayuki Wakatake, Happy Valley, Hong Kong; a part interest

[ * ] Notice: The portion of the term of this patent subsequent to Mar. 29, 2011 has been disclaimed.

[21] Appl. No.: 971,153

[22] Filed: Nov. 4, 1992

[30] Foreign Application Priority Data

Nov. 5, 1991 [JP] Japan .................... 3-317560

[51] Int. Cl.⁵ .......... G02B 5/136; G02B 5/28; G02B 5/02; G09F 13/16
[52] U.S. Cl. .................... 359/546; 359/599; 359/619; 359/621; 359/627; 359/885; 40/582; 40/605
[58] Field of Search ........... 359/443, 449, 451, 459, 359/515, 527, 546, 547, 552, 584, 599, 615, 619, 621, 627, 885, 891, 892; 40/563, 581, 582, 612, 605

[56] References Cited

U.S. PATENT DOCUMENTS

| | | | |
|---|---|---|---|
| 1,791,936 | 2/1931 | Rolph | 359/552 X |
| 1,858,975 | 5/1932 | Ta'bois | 40/582 |
| 3,260,156 | 7/1966 | Komitor | 359/459 X |
| 3,540,282 | 11/1970 | Köler et al. | 359/547 |
| 4,040,760 | 8/1977 | Wyckoff | 40/612 X |
| 4,756,603 | 7/1988 | Ohtani | 359/459 |

Primary Examiner—William L. Sikes
Assistant Examiner—David R. Parsons
Attorney, Agent, or Firm—Sixbey, Friedman, Leedom & Ferguson

[57] ABSTRACT

A pseudo-luminous panel has a substrate and a thin film optical color filter formed all over the main surface of the substrate with or without a reflecting film interposed therebetween. The main surface of the substrate is formed by obliquely downward and upward band-like surfaces alternately arranged side by side in a vertical direction. The downward band-like surfaces of the substrate, or downward band-like surfaces of the reflecting film formed on the downward band-like surfaces of the substrate are each a smooth reflecting surface. The upward band-like surfaces of the substrate, or the upward band-like surfaces of the reflecting film formed on the upward band-like surfaces of the substrate, are each a smooth, irregular or uneven reflecting surface. Obliquely downward band-like surfaces of the color filter are each a smooth surface extending straight in the longitudinal section of the panel, and obliquely upward band-like surfaces of the color filter are each a rough surface. With the pseudo-luminous panel of such a structure, it is possible to prevent that a pattern on the panel is too dazzling in the daytime and too dark at night to recognize in a predetermined hue when the panel is set up outdoors high above the ground.

19 Claims, 24 Drawing Sheets

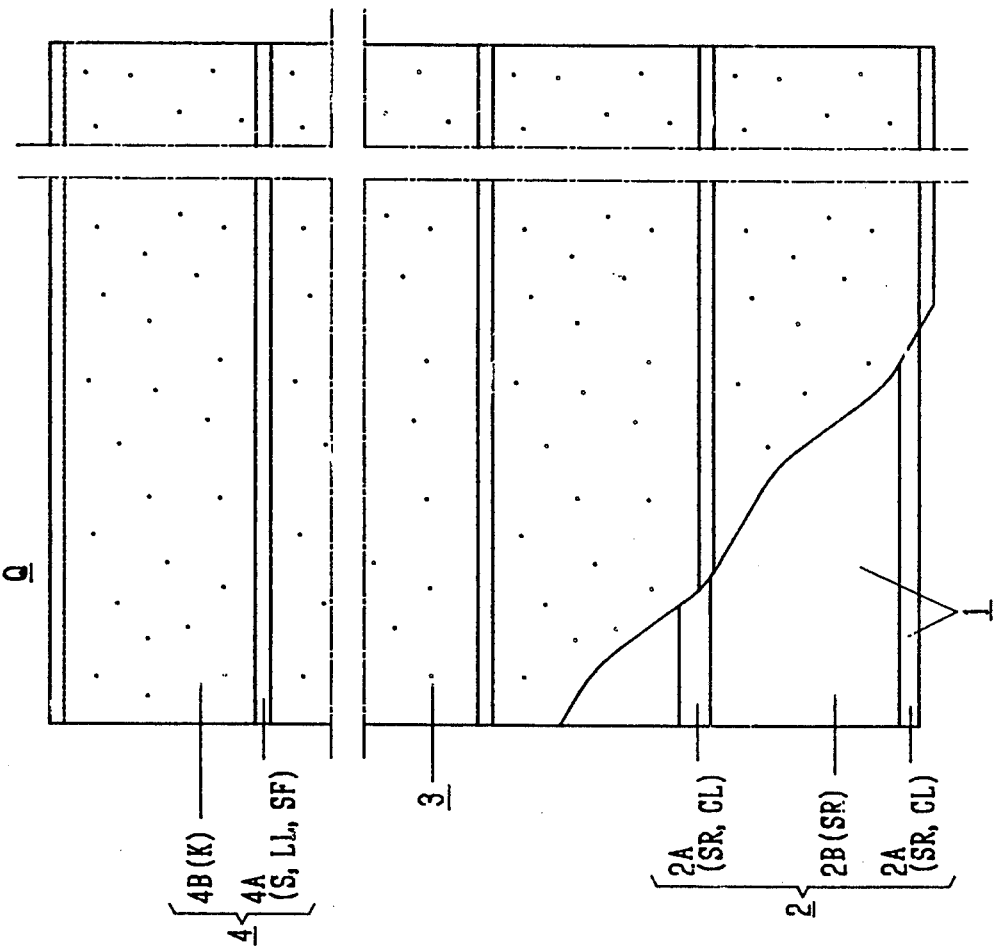
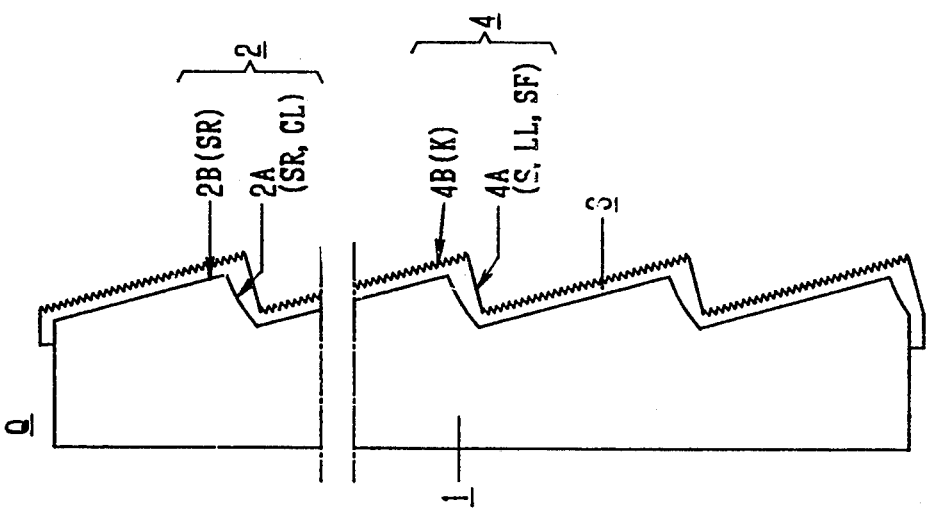

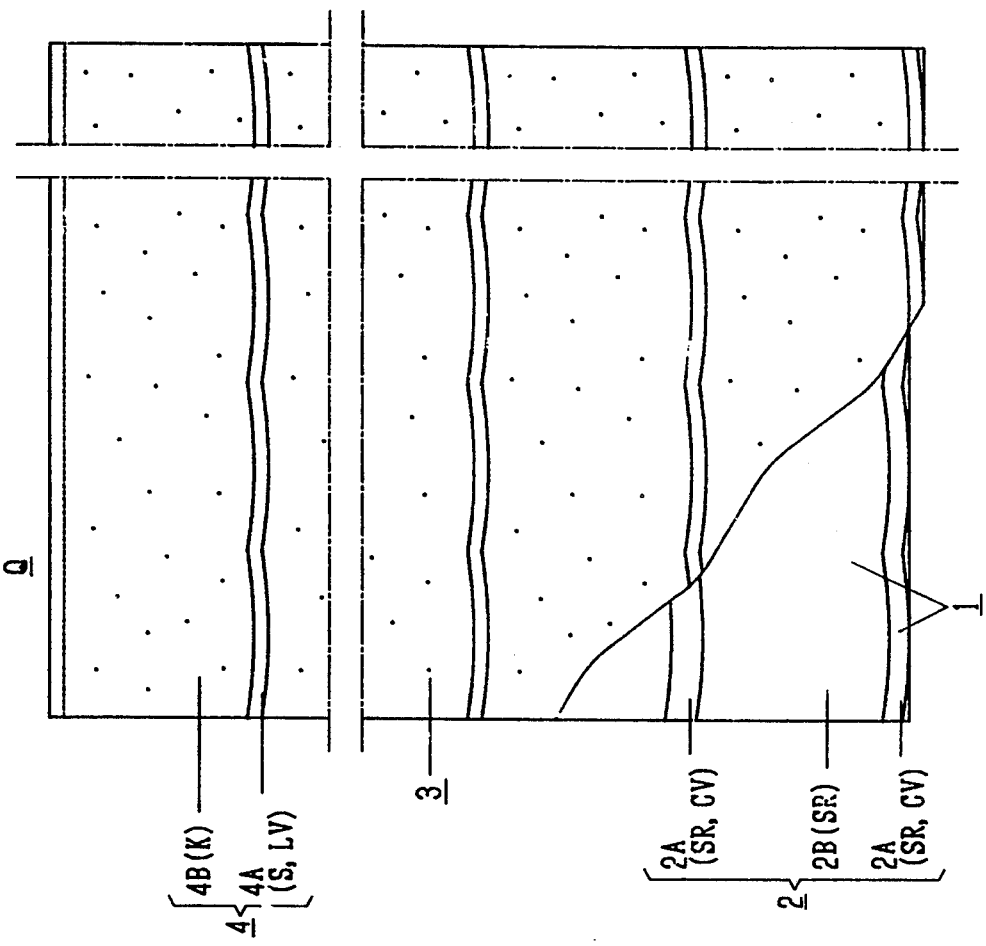
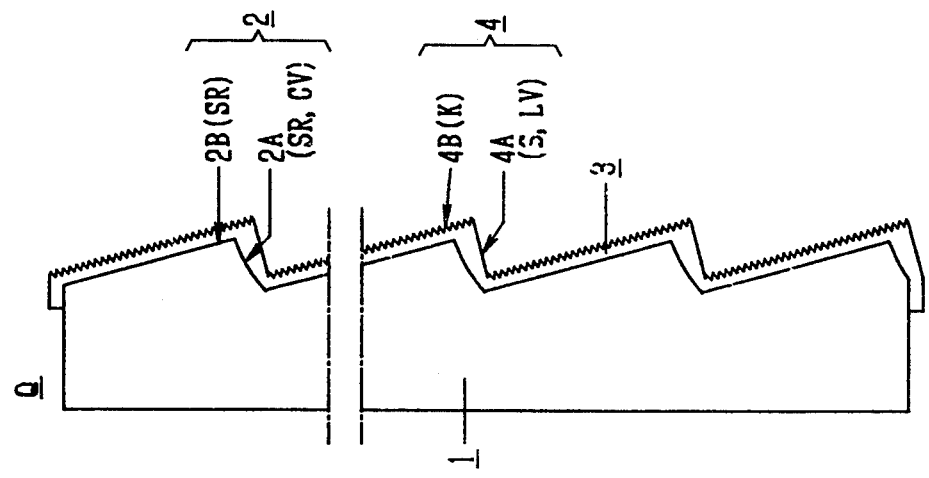

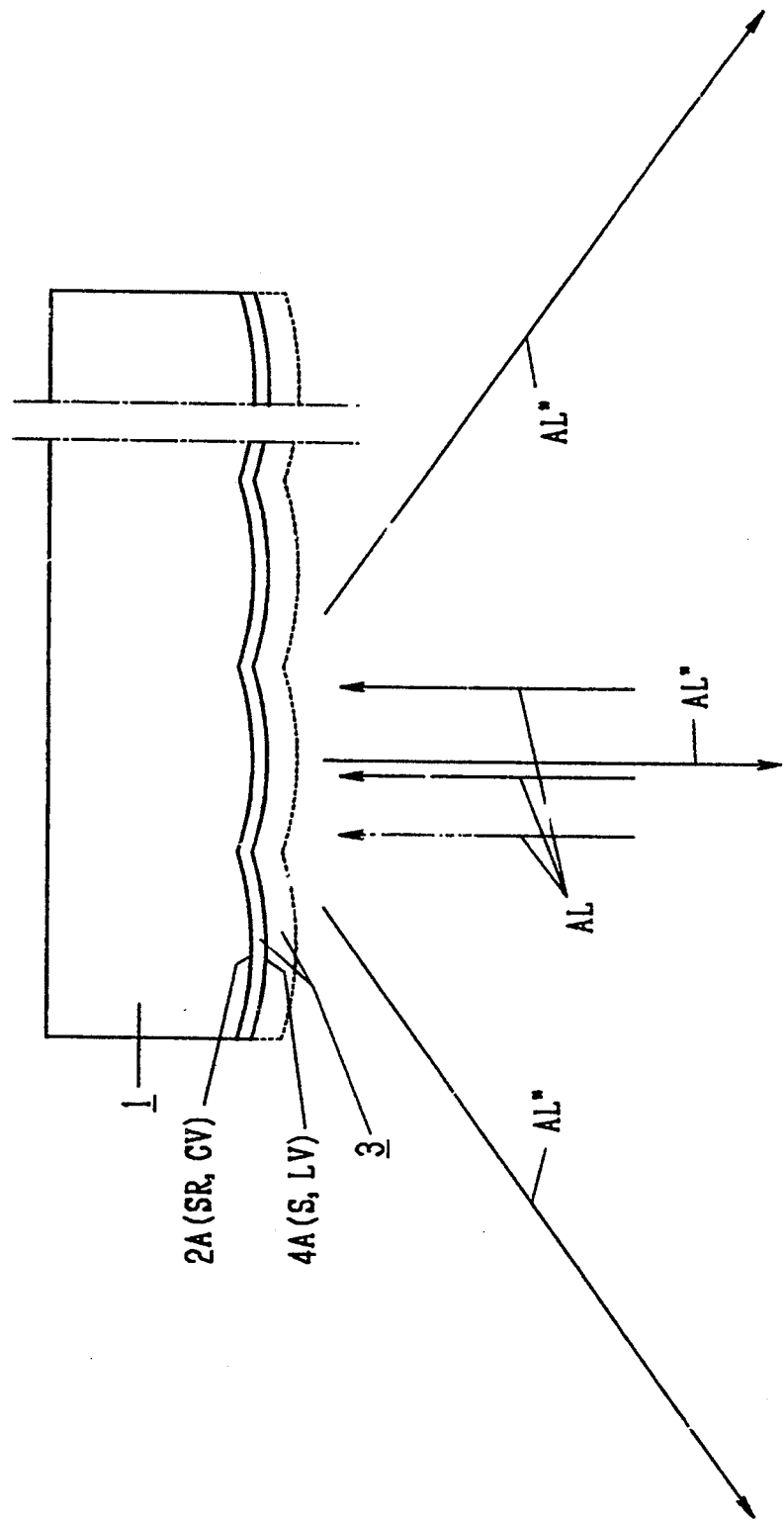

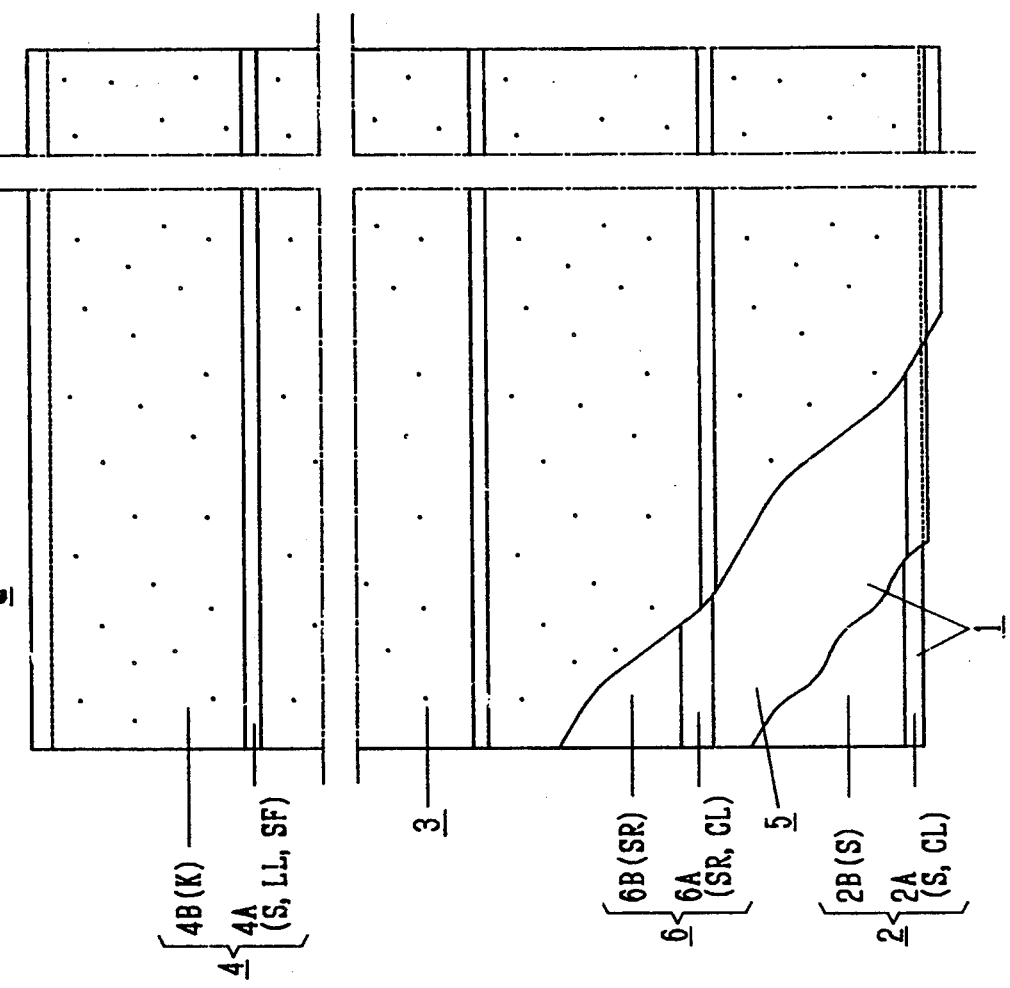
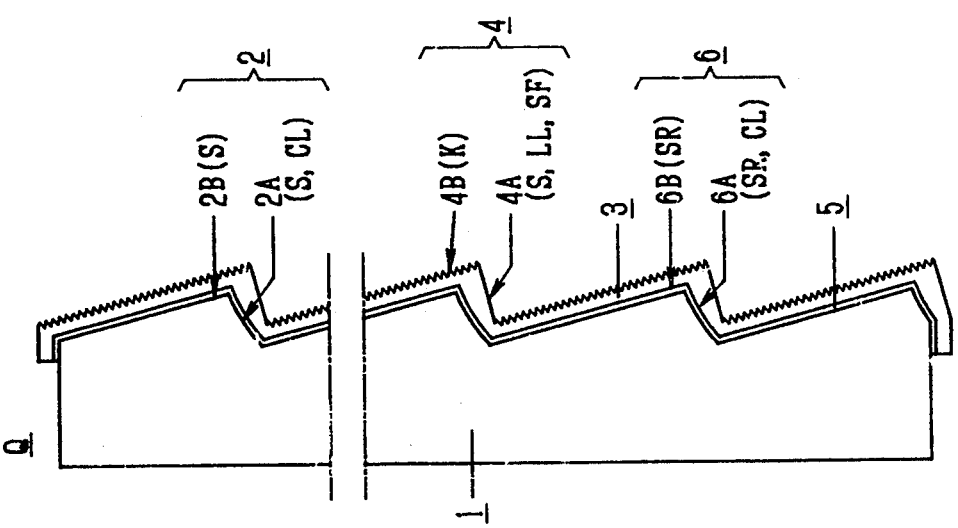

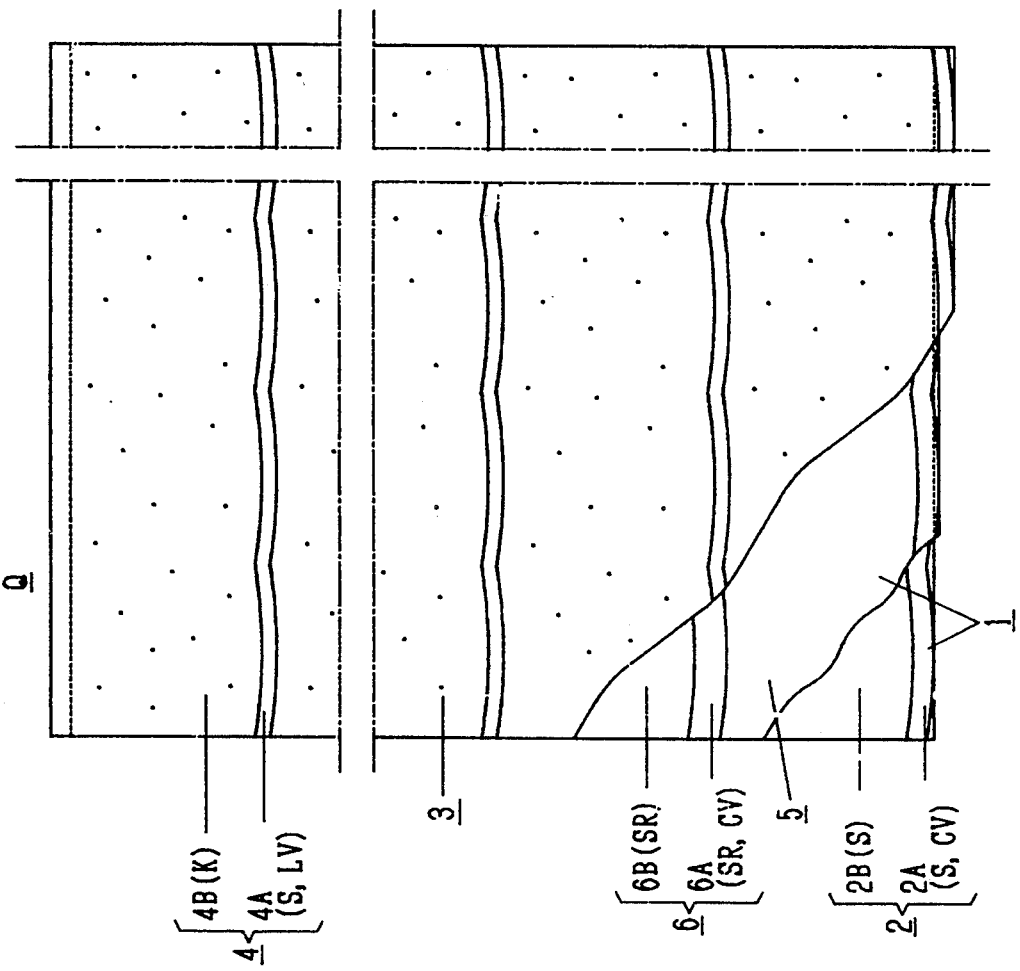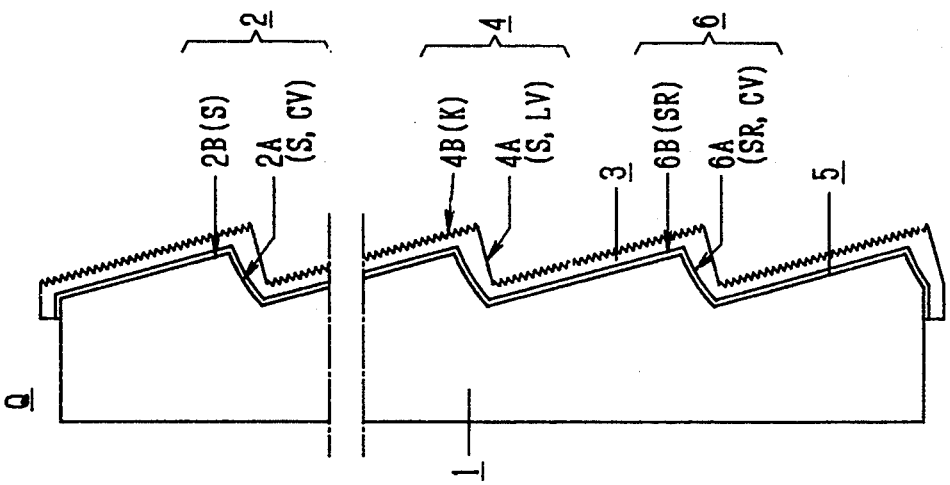

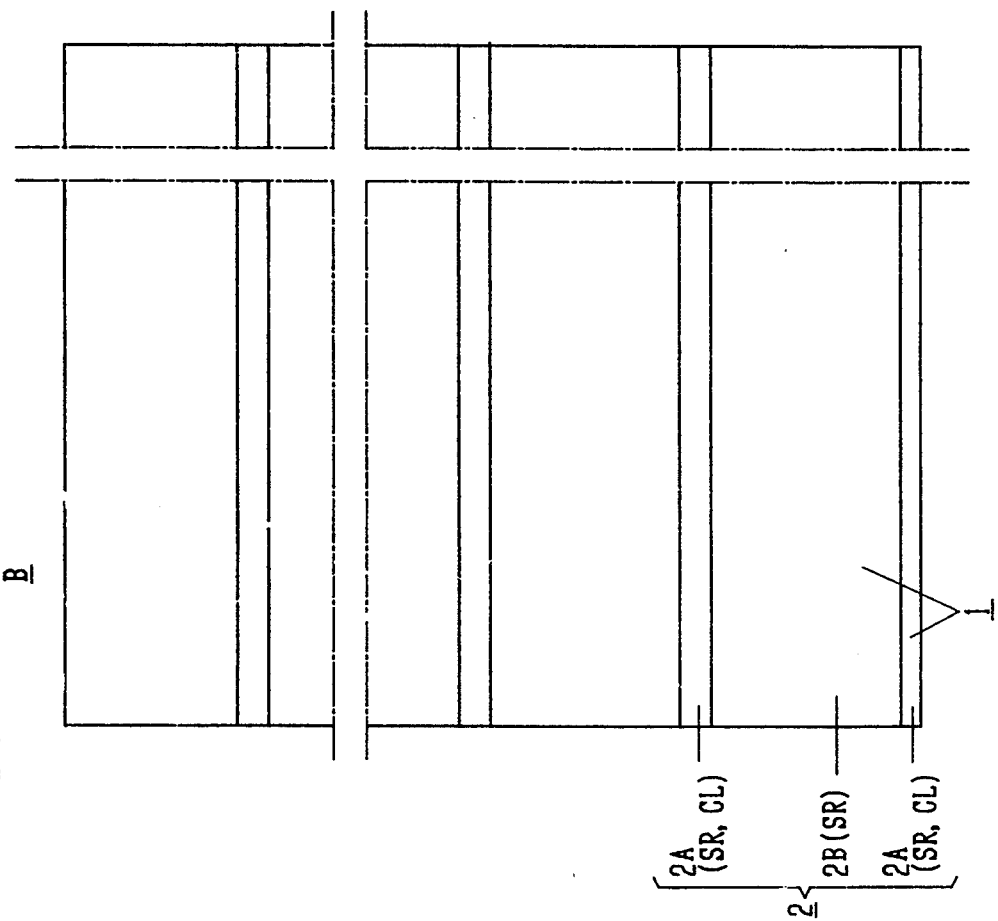
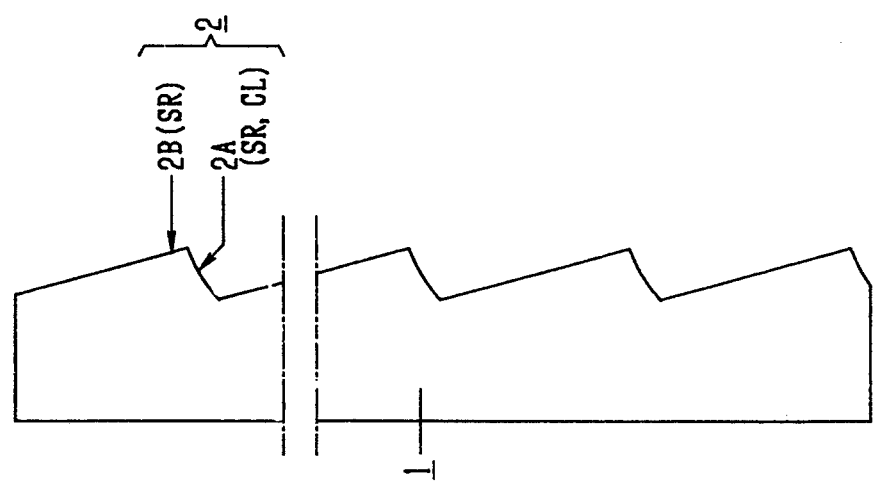

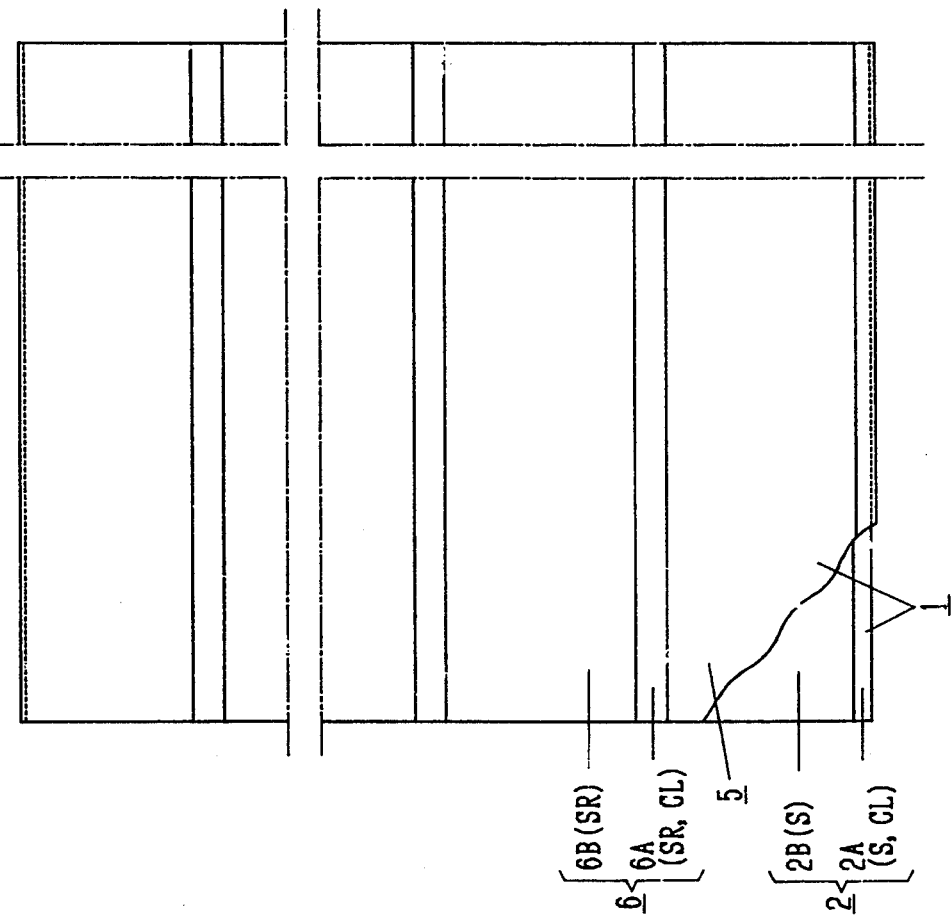
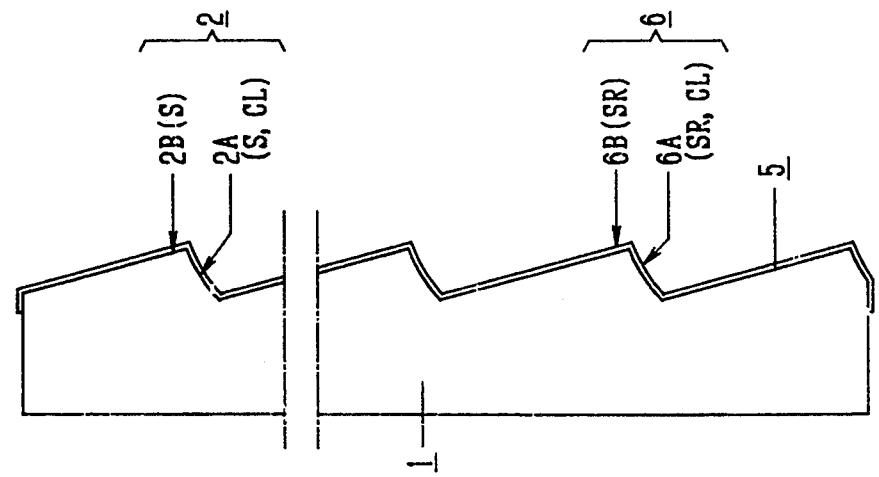

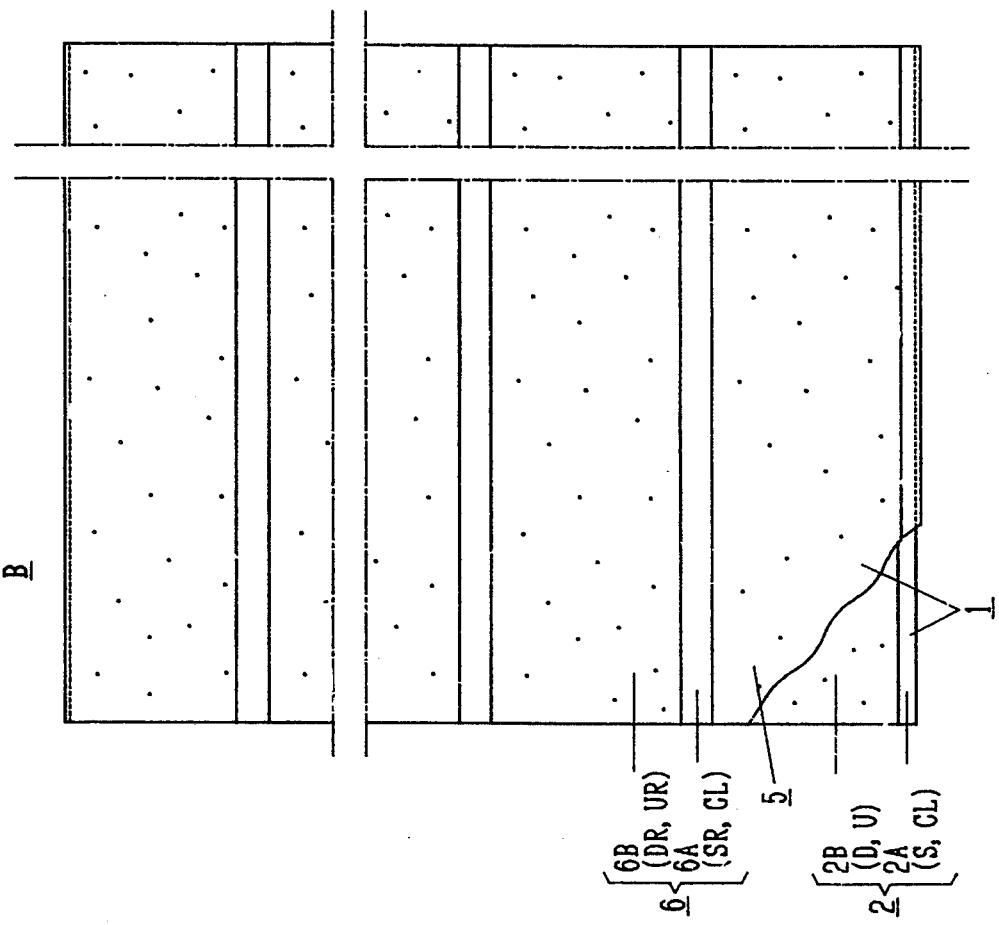
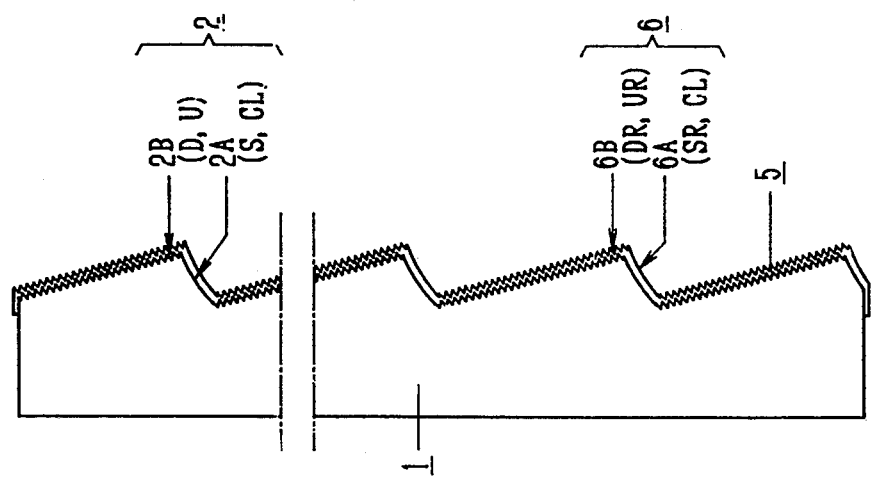

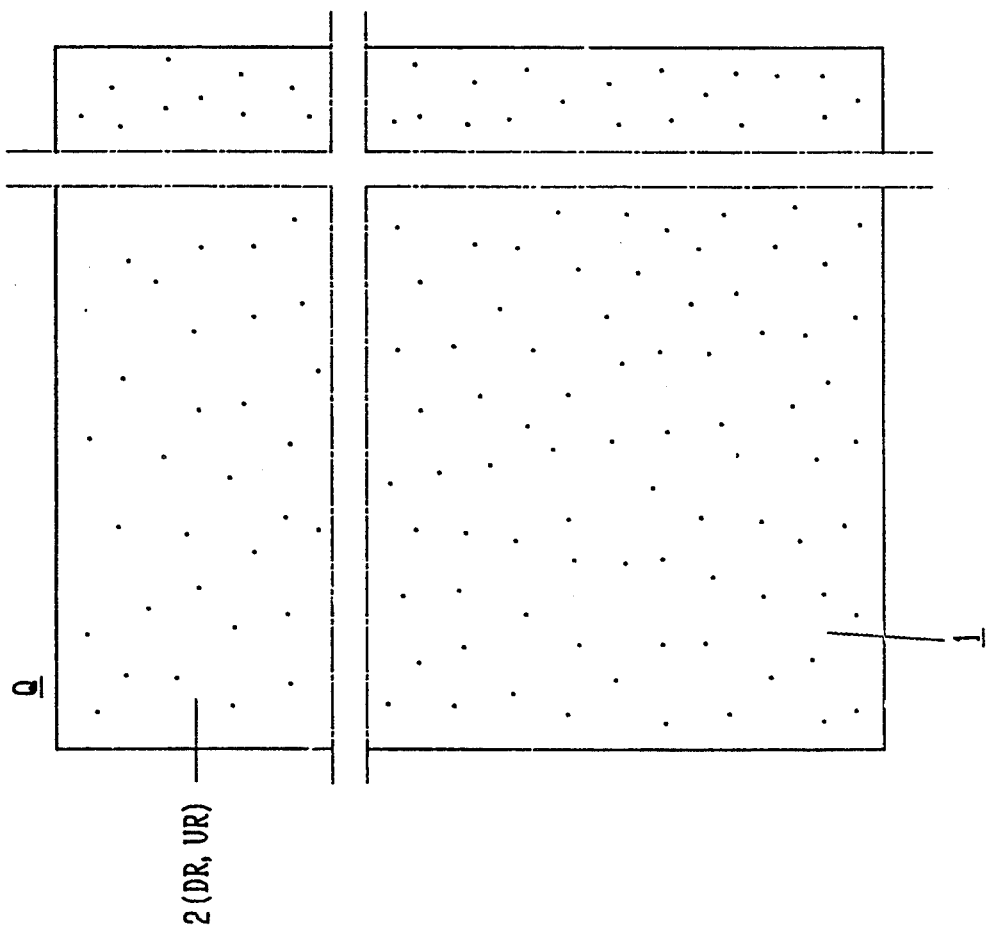
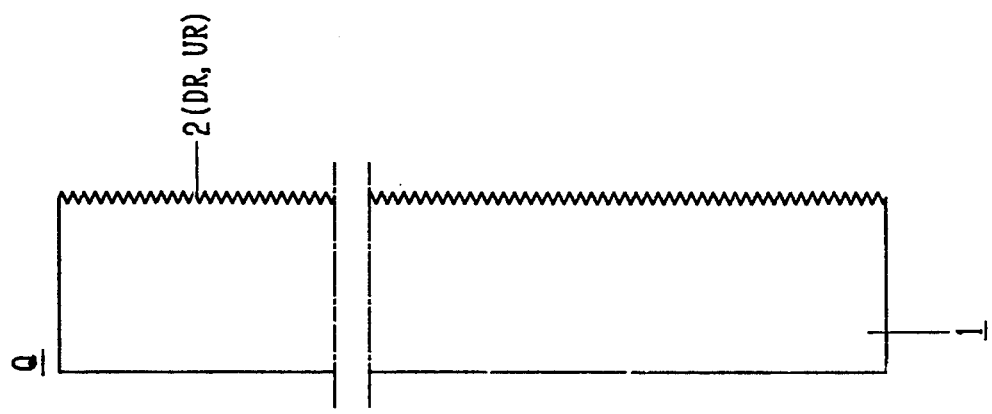

PSEUDO-LUMINOUS PANEL, SUBSTRATE THEREFOR, AND DISPLAY ELEMENT AND DEVICE USING THE PSEUDO-LUMINOUS PANEL

BACKGROUND OF THE INVENTION

1. Field of the Invention

The present invention relates to a pseudo-luminous panel, a substrate therefor, and a display element and a display device employing the pseudo-luminous panel.

2. Description of the Prior Art

FIGS. 39 and 40 show a conventional pseudo-luminous panel Q which has, for example, a square substrate 1 the main surface 2 of which is formed by an irregular or uneven reflection surface DR or UR extending in a vertical plane.

When such a conventional pseudo-luminous panel Q is disposed outdoors, for example, high above the ground G by use of a support H as shown in FIG. 41, the main surface 2 of the substrate 1 is directly irradiated over the entire area thereof by sunlight SL from above diagonally to the front of the substrate 1 in the daytime. In other words the sunlight SL directly illuminates the main surface 2 of the substrate 1 over the entire area thereof from above diagonally to the front of the substrate 1. The sunlight SL thus falling on the main surface 2 of the substrate 1 enters thereinto. In this instance, since the main surface 2 of the substrate 1 is the irregular or uneven reflection surface DR or UR, the sunlight SL incident on such a main surface 2 irregularly enters therethrough into the substrate 1. The sunlight SL thus having irregularly entered into the substrate 1 is irregularly reflected therein. The irregularly reflected light is emitted forwardly of the pseudo-luminous panel through the main surface 2 of the substrate 1. In this case, the irregularly reflected light is irregularly emitted from the panel Q, since the main surface 2 is formed by the irregular or uneven reflection surface DR or UR as mentioned above. Thus, scattered light SL' derived from the sunlight SL is obtained in front of the pseudo-luminous panel Q.

The scattered light SL' results from the passage through the portion of the main surface 2 side of the substrate 1, and hence has a hue corresponding to the pass band of the main surface portion of the substrate 1 in terms of its band pass characteristic. A portion of the scattered light SL' emitted from the pseudo-luminous panel Q is directed toward the ground G. Hence, in the daytime a person M standing on the ground G diagonally below the pseudo-luminous panel Q can perceive a pattern of the main surface 2 in a color tone corresponding to the pass band of the main surface portion of the substrate 1.

When irradiating the pseudo-luminous panel Q, at night, by artificial light AL of a band covering the pass band of the main surface portion of the substrate 1 from a projector P disposed on the ground G diagonally below to the front of the panel Q, as shown in FIG. 41, the artificial light AL irregularly enters into the main surface portion of the substrate 1 through the main surface 2 and is then irregularly reflected and the irregularly reflected light is emitted as scattered light AL' from the pseudo-luminous panel Q through the main surface 2 of the substrate 1.

As is the case with the scattered light SL', the scattered light AL' also results from the passage through the main surface portion of the substrate 1, and hence has the hue corresponding to the pass band of the main surface portion of the substrate 1, and a portion of scattered light AL' is directed to the ground G. Accordingly, the person M on the ground can perceive the pattern of the main surface 2 of the substrate 1 in a color tone corresponding to the pass band of the main surface portion of the substrate 1.

Thus, in the case where the conventional pseudo-luminous panel Q shown in FIGS. 39 and 40 is disposed outdoors, for example, high above the ground G and is irradiated by the sunlight SL in the daytime and by the artificial light AL from the projector P at night as described above, it is possible to make the person M on the ground G perceive day and night the pattern of the main surface 2 of the substrate 1 in the hue corresponding to the pass band of the main surface portion of the substrate 1.

Incidentally, the energy of the artificial light AL from the projector P is far lower than the energy of the sunlight SL owing to a limitation on the manufacture of the projector P and for some other reasons. Hence there is a markedly large difference between the energy of the sunlight SL received by the pseudo-luminous panel Q in the daytime and the energy of the artificial light AL illuminating the panel Q at night. In the daytime the viewer M perceives the pattern of the main surface 2 of the substrate 1 by a portion of the scattered light SL' caused by irregular reflection of the sunlight SL and at night he perceives the pattern of the main surface 2 by a portion of the scattered light AL' similarly caused by irregular reflection of the artificial light AL.

On this account, the conventional pseudo-luminous panel Q depicted in FIGS. 39 and 40 is defective in that when the substrate 1 is made relatively highly reflective by a suitable selection of its material so as to permit the viewer M to distinctly recognize the pattern of the main surface 2 of the substrate 1 at night, the pattern is so dazzling in the daytime that the viewer M may sometimes be unable to perceive the pattern itself.

Moreover, when the reflectivity of the substrate 1 is made low by a suitable selection of its material so that the pattern of the main surface 2 can clearly be recognized by the viewer M in the daytime, the pattern is very dark at night and in some cases it cannot be perceived in the color tone corresponding to the pass band of the main surface portion of the substrate 1.

SUMMARY OF THE INVENTION

It is therefore an object of the present invention to provide a novel pseudo-luminous panel which is free from the above-mentioned defects of the prior art, and a substrate for such a panel and a display element and a display device utilizing such a pseudo-luminous panel.

According to a first aspect of the present invention, the pseudo-luminous panel has a substrate and a thin film optical color filter formed all over the main surface of the substrate. The main surface of the substrate is composed of obliquely downward and upward band-like surface portions alternately arranged side by side in the vertical direction. The obliquely downward band-like surface portions each form a smooth reflecting surface, and the obliquely upward band-like surface portions each form a smooth, irregular or uneven reflecting surface. Obliquely downward band-like surface portions of the thin film optical color filter on the obliquely downward band-like surface portions of the substrate, forming the surface of the thin film optical color filter on the opposite side from the substrate, are each a smooth surface extending straight in the longitudinal section of the panel. On the other hand, obliquely upward band-like surface portions of the thin optical color filter on the obliquely upward band-like surface portions of the substrate, forming the surface of the thin film optical color filter on the opposite side from the substrate, are each a rough surface.

According to a second aspect of the present invention, the pseudo-luminous panel has a substrate and a thin film optical color filter formed all over the main surface of the substrate. The main surface of the substrate is composed of obliquely downward and upward band-like surface portions alternately arranged side by side in the vertical direction. The obliquely downward band-like surface portions forming the main surface of substrate are each a smooth reflecting surface slightly concave in the longitudinal section of the panel, whereas the obliquely upward band-like surface portions are smooth, irregular or uneven reflecting surfaces. Obliquely downward band-like surface portions of the thin film optical color filter on the obliquely downward band-like surface portions of the substrate, forming the surface of the thin film optical color film on the opposite side from the substrate, are each a smooth surface extending straight in the longitudinal section of panel. Obliquely upward band-like surface portions of the thin film optical color filter on the obliquely upward band-like surface portions of the substrate, forming the surface of the thin film optical color filter on the opposite side from the substrate, are rough surfaces.

According to a third aspect of the present invention, the pseudo-luminous panel has a substrate, a reflecting film formed all over the main surface of the substrate and a thin film optical color filter formed all over the surface of the reflecting film on the opposite side from the substrate. The main surface of the substrate is composed of obliquely downward and upward band-like surface portions alternately arranged side by side in the vertical direction. Obliquely downward band-like surface portions of the reflecting film on the obliquely downward band-like surface portions of the substrate,- forming the surface of the reflecting film on the opposite side from the substrate, are smooth reflecting surfaces. Obliquely upward band-like surface portions of the reflecting film on the obliquely upward band-like surface portions of the substrate, forming the surface of the reflecting film on the opposite side from the substrate, are smooth, irregular or uneven reflecting surfaces. Obliquely downward band-like surface portions of the thin film optical color filter on the obliquely downward band-like surface portions of the reflecting film, forming the surface of the thin film optical color filter on the opposite side from the reflecting film, are smooth surfaces extending straight in the longitudinal section of the panel. Obliquely upward band-like surface portions of the thin film optical color filter on the obliquely upward band-like surface portions of the reflecting film, forming the surface of the thin film optical color filter on the opposite side from the reflecting film, are rough surfaces.

According to a fourth aspect of the present invention, the pseudo-luminous panel has a substrate, a reflecting film coated all over the main surface of the substrate and a thin film optical color filter coated all over the surface of the reflecting film on the opposite side from the substrate. The main surface of the substrate is composed of obliquely downward and upward band-like portions alternately arranged side by side in the vertical direction. Obliquely downward band-like surface portions of the reflecting film on the obliquely downward band-like surface portions of the substrate, forming the surface of the reflecting film on the opposite side from the substrate, form smooth reflecting surfaces concave in the longitudinal section of the panel. Obliquely upward band-like surface portions of the reflecting film on the obliquely upward band-like surface portions of the substrate, forming the surface of the reflecting film on the opposite side from the substrate, are smooth, irregular or uneven reflecting surfaces. Obliquely downward band-like surface portions of the thin film optical color filter on the obliquely downward band-like surface portions of the reflecting film, forming the surface of the thin film optical color filter on the opposite side from the reflecting film, have smooth surfaces extending straight in the longitudinal section of the panel. Obliquely upward band-like surface portions of the thin film optical color filter on the obliquely upward band-like surface portions of the reflecting film, forming the surface of the thin film optical color filter on the opposite side therefrom, have uneven surfaces.

According to a fifth aspect of the present invention, the obliquely downward band-like surface portions forming the main surface of the substrate each extend straight in the cross-section of the panel in the pseudo-luminous panel according to the first or second aspect of the invention.

According to a sixth aspect of the present invention, the obliquely downward band-like surface portions forming the main surface of the substrate each protrude forward in the cross-section of the panel in the pseudo-luminous panel according to the first or second aspect of the invention.

According to a seventh aspect of the present invention, the obliquely downward band-like surface portions forming the surface of the reflecting film each extend straight in the cross-section of the panel in the pseudo-luminous panel according to the third or fourth aspect of the invention.

According to an eighth aspect of the present invention, the obliquely downward band-like surface portions forming the surface of the reflecting film each protrude obliquely downward in the cross-section of the panel.

According to a ninth aspect of the present invention, the substrate is flexible in the pseudo-luminous panel according to the third or fourth aspect of the invention.

According to a tenth aspect of the present invention, the substrate for the pseudo-luminous panel has its main surface formed by a surface in which obliquely downward and upward band-like surface portions are alternately arranged side by side in the vertical direction. The obliquely downward band-like surface portions form smooth reflecting surfaces linearly extending in the longitudinal section of the panel, and the obliquely upward band-like surface portions form smooth, irregular or uneven reflecting surfaces.

According to an eleventh aspect of the present invention, the substrate for the pseudo-luminous panel has its main surface formed by obliquely downward and upward band-like surface portions alternately arranged side by side in the vertical direction. The obliquely downward band-like surface portions form smooth reflecting surfaces concave in the longitudinal section of the panel. The obliquely upward band-like surface portions form smooth, irregular or uneven reflecting surface.

According to a twelfth aspect of the present invention, the substrate for the pseudo-luminous panel has a substrate and a reflecting film formed all over the main surface of the substrate. The main surface of the substrate is composed of obliquely downward and upward band-like surface portions alternately arranged side by side in the vertical direction. Obliquely downward band-like surface portions of the reflecting film on the obliquely downward band-like surface portions of the substrate, forming the surface of the reflecting film on the opposite side from the substrate, form smooth reflecting surfaces linearly extending in the longitudinal section of the panel. Obliquely upward band-like surface portions of the reflecting film on the obliquely upward band-like surface portions of the substrate, forming the surface of the reflecting film on the opposite side from the substrate, form smooth, irregular or uneven reflecting surfaces.

According to a thirteenth aspect of the present invention, the substrate for the pseudo-luminous panel has a substrate and a reflecting film coated all over the main surface of the substrate. The main surface of the substrate is composed of obliquely downward and upward band-like portions alternately arranged side by side in the vertical direction. Obliquely downward band-like surface portions of the reflecting film on the obliquely downward band-like surface portions of the substrate, forming the surface of the reflecting film on the opposite side from the substrate, form smooth reflecting surfaces concave in the longitudinal section of the panel. Obliquely upward band-like surface portions of the reflecting film on the obliquely downward band-like surface portions of the substrate, forming the surface of the reflecting film on the opposite side from the substrate, form smooth, irregular or uneven reflecting surface.

According to a fourteenth aspect of the present invention, the obliquely downward band-like surface portions forming the main surface of the substrate each linearly extend in the cross-section of the panel in the substrate for the pseudo-luminous panel according to the tenth or eleventh aspect of the invention.

According to a fifteenth aspect of the present invention, the obliquely downward band-like surface portions of the main surface of the substrate each repeatedly protrude obliquely forward in the cross-section of the panel in the substrate for the pseudo-luminous panel according to the tenth or eleventh aspect of the invention.

According to a sixteenth aspect of the present invention, the substrate for the pseudo-luminous panel according to the tenth or eleventh aspect of the invention is flexible.

According to a seventeenth aspect of the present invention, the obliquely downward band-like surface portions forming the surface of the reflecting film linearly extend in cross-section in the substrate for the pseudo-luminous panel according to the twelfth or thirteenth aspect of the invention.

According to an eighteenth aspect of the present invention, the obliquely downward band-like surface portions forming the surface of the reflecting film each repeatedly protrude obliquely forward in the cross-section of the panel in the substrate for the pseudo-luminous panel according to the twelfth or thirteenth aspect of the invention is flexible.

According to a nineteenth aspect of the present invention, the substrate for the pseudo-luminous panel according to the twelfth or thirteenth aspect of the invention is flexible.

According to a twentieth aspect of the present invention, the display element employs plurality of pseudo-luminous panels according to the first, second, third or fourth aspect of the invention. The plurality of pseudo-luminous panels are arranged on a support frame so that they are selectively activated. The thin film optical color filters of the pseudo-luminous panels have different pass bands in terms of their band-pass characteristics.

According to a twenty-first aspect of the present invention, the fixed matrix display employs a plurality of pseudo-luminous panels according to the first, second, third or fourth aspect of the invention, and they are arranged in a matrix form on a support frame.

According to twenty-second aspect of the present invention, the matrix display employs a plurality of display elements, which are arranged in a matrix form on a support frame. In this instance, the display elements each have a plurality of pseudo-luminous panels according to the first, second, third or fourth aspect of the invention. The pseudo-luminous panels are arranged on a support frame so that they are selectively activated. The thin film optical color filters of the pseudo-luminous panels have different pass bands in terms of their band-pass characteristics.

When the pseudo-luminous panel according to the first aspect of the present invention is disposed outdoors, for instance, high above the ground as described previously in respect of FIGS. 39 and 40, sunlight directly strikes the obliquely upward band-like surface portions of the thin film optical color filter on the substrate at an angle from above but hardly strike the obliquely downward band-like surface portions of the color filter. The sunlight directly striking the obliquely upward band-like surface portions of the color filter enter thereinto and then the obliquely upward band-like surface portions forming the main surface of the substrate. Since the obliquely upward band-like surface portions of the thin film optical color filter on the opposite side from the substrate are rough, the sunlight is irregularly reflected on and in the obliquely upward band-like surface portions of the substrate surface. The irregular reflected light passes again through the thin film optical color filter and then its obliquely upward band-like surface portions, thereafter being emitted as scattered light from the pseudo-luminous panel.

Since the scattered light has passed through the thin film optical color filter, it has a hue corresponding to the pass band of the optical color filter in terms of its band-pass characteristic. A portion of the scattered light naturally falls on the ground, and consequently, the viewer on the ground can perceive a pattern of the main surface of the substrate in the hue corresponding to the pass band of the optical color filter.

By setting a projector on the ground and suitably selecting the position of the projector relative to the pseudo-luminous panel set up high above the ground as mentioned above and by irradiating the panel with artificial light of a band covering the pass band of the optical color filter in terms of its band pass characteristic, the artificial light can be projected from the projector, at night, mostly onto the obliquely downward band-like surface portions of the thin film optical color filter.

The artificial light directly striking the obliquely downward band-like surface portions of the color filter enters thereinto and then the underlying surface portions of the substrate. Since the obliquely downward band-like surface portions of the substrate are smooth reflecting surfaces, the incident light is hardly irregularly reflected but is reflected obliquely downward by the substrate. The reflected light passes through the color filter again and its obliquely downward surface portions and is emitted, as directly reflected light, diagonally downward from the pseudo-luminous panel.

The reflected light thus emitted from the panel has passed through the thin film optical color filter, and hence has a hue corresponding to the pass band of the color filter in terms of its band-pass characteristic. Thus the viewer on the ground can perceive the pattern of the main surface of the substrate in the hue corresponding to the pass band of the color filter.

With such a pseudo-luminous panel according to the first aspect of the present invention, the pattern of the main surface of the substrate can be seen from the ground equally in the daytime and at night in the hue corresponding to the pass band of the color filter.

Also in this instance, the energy of the artificial light is far lower than the energy of sunlight for the same reasons given previously with respect to the conventional pseudo-luminous panel depicted in FIGS. 39 and 40, and there is a substantial difference between the energy of sunlight striking the panel in the day time and the energy of the artificial light projected onto the panel at night. However, in the daytime the viewer on the ground perceives the pattern of the main surface of the substrate by a portion of the scattered light resulting from the irregular reflection of sunlight, whereas at night the viewer perceives the pattern mainly by the directly reflected light of the artificial light, not portion of such scattered light.

Hence, even if the reflectivity of the substrate is made relatively high by a suitable selection of its material so that the pattern of its main surface can be clearly recognized at night, the pattern is not dazzling in the daytime and can be seen in the hue based on the pass band of the color filter. Further, even if the reflectivity of the substrate is made relatively low by a suitable selection of its material so that the dazzling of the pattern is reduced in the daytime, the pattern is not dark and can be seen at night as well in the hue based on the pass band of the color filter.

With the pseudo-luminous panel according to the first aspect of the present invention, the sunlight falling on the obliquely upward band-like surface portions of the thin film optical color filter as mentioned above irregularly enters into the thin film optical filter. In this case, the sunlight is partly reflected by the obliquely upward band-like surface portions of the optical color filter. If the obliquely upward band-like surface portions of the optical color filter are not rough, then the partly reflected sunlight will be directed downward obliquely to the pseudo-luminous panel. Incidentally, such partly reflected sunlight has not passed through the thin film optical color filter, and hence has the hue of the sunlight (i.e. a white hue), in which case the pattern of the main surface of the substrate will be seen with a low degree of saturation and in the hue corresponding to the pass band of the thin film optical color filter but affected by the hue of the sunlight. In the pseudo-luminous panel according to the first aspect of the present invention, however, since the obliquely upward band-like surface portions of the thin film optical color filter are rough, the sunlight falling on them is partly reflected back as scattered light, and hence is hardly directed downward obliquely to the pseudo-luminous panel. Consequently, the pattern of the main surface of the substrate can be displayed with a high degree of saturation and in the hue corresponding to the pass band of the thin film optical color filter which is substantially unaffected by the hue of the sunlight.

Moreover, in the case of the pseudo-luminous panel according to the first aspect of the present invention, the artificial light applied directly to the obliquely downward band-like surface portions of the thin film optical color filter as mentioned above enters thereinto. In this case, the artificial light is partly reflected by the obliquely downward bank-like surface portions of the color filter. Also in this instance, if the obliquely downward band-like surface portions of optical filter are not smooth, the partly reflected light will be directed downward obliquely to the pseudo-luminous panel and it has the hue of the artificial light because it has not passed through the color filter. Hence, the pattern of the main surface of the substrate will be seen, at night, with a low degree of saturation and in the hue corresponding to the pass band of the color filter but affected by the hue of the artificial light. In the pseudo-luminous panel according to the first aspect of the present invention, however, since the obliquely downward bank-like surface portions which forms the surface of the thin film optical color filter on the opposite side from the substrate are smooth surfaces linearly extending in the longitudinal section of the panel, the pattern of the main surface of the substrate can be displayed with a high degree of saturation and in the hue corresponding to the pass band of the thin film optical color filter, substantially unaffected by the hue of the artificial light, by suitably selecting the direction of application of the artificial light, i.e. the position of the projector so that the artificial light from the projector strikes the above-said smooth obliquely downward band-like surface portions perpendicularly thereto and is partly reflected back to the projector, not to the viewer on the ground.

Thus, the pseudo-luminous panel according to the first aspect of the present invention permits the pattern of the main surface of the substrate to be displayed with a high degree of saturation and in the hue corresponding to the thin film optical color filter both in the daytime and at night.

The pseudo-luminous panel according to the second aspect of the present invention is identical in construction with the panel according to the first aspect of the invention, except that the obliquely downward band-like surface portions of the substrate form smooth reflecting surfaces which are concave in the longitudinal section of the panel. Hence, the same results as are obtainable with the pseudo-luminous panel according to the first aspect of the invention can be obtained.

In the case of the pseudo-luminous panel according to the second aspect of the present invention, however, the obliquely downward band-like surface portions, which form the main surface of the substrate, are smooth surfaces which are concave in the longitudinal section of the panel. By a suitable selection of the degree and direction of their concavity, a reflected version of the artificial light from the obliquely downward band-like surface portions of the substrate can be emitted to the outside of the panel downward obliquely thereto through only the obliquely downward band-like surface portions of the thin film optical filter, without the passage through its obliquely upward rough surface portions, and in addition, the reflected light thus emitted diagonally downward from the panel is permitted to spread over a wide angular range in the vertical direction. This prevents that the reflected version of the artificial light from the obliquely downward band-like surface portions of the substrate passes through the obliquely upward rough surface portions of the thin film optical color filter and is emitted as scattered light from the panel and the scattered light is partly directed downward obliquely thereto, and that the reflected version of the artificial light from the obliquely downward surface portions of the substrate is emitted from the panel obliquely downward thereto but does not spread over a wide angular range.

Thus, the pseudo-luminous panel according to the second aspect of the present invention allows the pattern of the main surface of the substrate to be seen at night with a high degree of lightness and in the hue corresponding to the pass band of the thin film optical color filter from the ground over a wide positional range in front of the panel.

With the pseudo-luminous panel according to the third aspect of the invention wherein the surface of the reflecting film corresponds to the main surface of the substrate in the pseudo-luminous panel according to the first aspect of the invention, it is possible to obtain the same results as are obtainable with the panel according to the first aspect of the invention, though not described in detail.

The pseudo-luminous panel according to the fourth aspect of the present invention is identical in construction with the panel according to the third aspect of the invention except that the obliquely downward band-like surface portions of the reflecting film form smooth reflecting surfaces which are concave in the longitudinal section of the panel. Hence, it is possible to obtain the same results as are obtainable with the structure according to the second aspect of the invention, though not described in detail.

With the pseudo-luminous panel according to the fifth aspect of the present invention, since the obliquely downward band-like surface portions of the substrate are smooth surfaces linearly extending in cross-section as in the case of the panel according to the first or second aspect of the invention, it is possible to provide the same results as those obtainable with them. Furthermore, reflected artificial light emitted diagonally downward from the pseudo-luminous panel does not unnecessarily scatter in the lateral direction. This structure allows the pattern of the main surface of the substrate to be distinctly seen at night from positions within a certain area limited in the lateral direction relative to the panel.

With the pseudo-luminous panel according to the sixth aspect of the present invention, since the obliquely downward band-like surface portions of the substrate are smooth reflecting surfaces which protrude forwardly in cross-section as in the case of the panel according to the first or second aspect of the invention, it is possible to obtain the same results as those obtainable with them, Furthermore, reflected artificial light emitted diagonally downward from the pseudo-luminous panel spreads in the lateral direction. This structure allows the pattern of the main surface of the substrate to be distinctly seen at night from positions almost everywhere in the lateral direction relative to the panel.

With the pseudo-luminous panel according to the seventh aspect of the present invention, since the obliquely downward band-like surface portions of the reflecting film are smooth reflecting surfaces which linearly extend in the longitudinal section of the panel as in the case of the panel according to the third or fourth aspect of the invention, it possible to provide the same results as those obtainable with them. Moreover, reflected artificial light emitted diagonally downward from the panel does not unnecessarily spread in the lateral direction. This structure allows the pattern of the main surface of the substrate to be distinctly seen at night from positions within a certain area limited in the lateral direction relative to the panel.

With the pseudo-luminous panel according to the eighth aspect of the present invention, since the obliquely downward band-like surface portions of the reflecting film are smooth reflecting surfaces which protrude forwardly in cross-section as in the case of the panel according to the third or fourth aspect of the invention, it is possible to provide the same results as those obtainable with them. Moreover, reflected artificial light emitted diagonally downward from the panel spreads in the lateral direction relative thereto. This structure allows the pattern of the main surface of the substrate to be distinctly seen at night from positions almost everywhere in the lateral direction relative to the panel.

In the pseudo-luminous panel according to the ninth aspect of the present invention, since the substrate is flexible as in the case of the panel according to the first, second, third or fourth aspect of the invention, it is possible to provide the same results as those obtainable with them, and in addition, this panel can be rolled up just like a sheet, and hence is easy to handle.

With the substrate according to the tenth aspect of the present invention, the pseudo-luminous panel according to the first aspect of the invention which produces the afore-mentioned excellent effects can easily be obtained simply by forming its thin film optical color filter over the main surface of the substrate.

With the substrate according to the eleventh aspect of the present invention, the pseudo-luminous panel according to the second aspect of the invention which produces the afore-mentioned excellent effects can easily be obtained simply by forming its thin film optical color filter over the main surface of the substrate.

With the substrate according to the twelfth aspect of the present invention, the pseudo-luminous panel according to the third aspect of the invention which produces the afore-mentioned excellent effects can easily be obtained simply by forming over the main surface of the substrate the thin film optical color filter in the pseudo-luminous panel according to the third aspect of the invention.

With the substrate according to the thirteenth aspect of the present invention, the pseudo-luminous panel according to the fourth aspect of the invention which produces the afore-mentioned excellent effects simply by forming over the main surface of the substrate the thin film optical color filter in the pseudo-luminous panel according to the fourth aspect of the invention.

With the substrate according to the fourteenth aspect of the present invention, the pseudo-luminous panel according to the fifth aspect of the invention which produces the afore-mentioned excellent effects can easily be obtained simply by forming over the main surface of the substrate the thin film optical color filter in the pseudo-luminous panel according to the first or second aspect of the invention.

With the substrate according to the fifteenth aspect of the present invention, the pseudo-luminous panel according to the sixth aspect of the invention which produces the afore-mentioned excellent effects can easily be obtained simply by forming the reflecting film over its main surface with the thin film optical color filter in the pseudo-luminous panel according to the first or second aspect of the invention.

With the substrate according to the sixteenth aspect of the present invention, the pseudo-luminous panel according to the ninth aspect of the invention which produces the afore-mentioned excellent effects can easily be obtained by forming over the main surface of the substrate the thin film optical color filter in the pseudo-luminous panel according to the first or second aspect of the invention.

With the substrate according to the seventeenth aspect of the present invention, the pseudo-luminous panel according to the seventh aspect of the invention can easily be obtained simply by forming over the main surface of the reflecting film of the substrate the thin film optical color filter in the pseudo-luminous panel according to the third or fourth aspect of the invention.

With the substrate according to the eighteenth aspect of the present invention, the pseudo-luminous panel according to the eighth aspect of the invention can easily be obtained simply by forming over the main surface of the reflecting film of the substrate the thin film optical color filter in the pseudo-luminous panel according to the third or fourth aspect of the invention.

With the substrate according to the nineteenth aspect of the present invention, the pseudo-luminous panel according to the ninth aspect of the invention which produces the aforementioned excellent effects can easily be obtained simply by forming over the main surface of the substrate the thin film optical color filter in the pseudo-luminous panel according to the third or fourth aspect of the invention.

With the display element according to the twentieth aspect of the present invention, different hues based on different pass bands of the respective thin film optical color filters can be obtained, together with the afore-mentioned excellent effects obtainable with the pseudo-luminous panel according to the first, second, third or fourth aspect of the invention.

With the fixed matrix display device according to the twenty-first aspect of the present invention, characters, figures and other patterns can be displayed in a desired hue together with the afore-mentioned excellent effects obtainable with the pseudo-luminous panel according to the first, second, third or fourth aspect of the invention.

With the matrix display device according to the twenty-second aspect of the present invention, characters, figures and other patterns selected as desired can be displayed in a desired hue together with the aforementioned excellent effects obtainable with the pseudo-luminous panel according to the first, second, third or fourth aspect of the invention.

BRIEF DESCRIPTION OF THE DRAWINGS

FIG. 1 is longitudinal-sectional view schematically illustrating a first embodiment of the pseudo-luminous panel according to the present invention;

FIG. 2 is a front view, partly cut away, showing the first embodiment of the pseudo-luminous panel according to the present invention;

FIG. 6 is longitudinal-sectional view schematically illustrating a third embodiment of the pseudo-luminous panel according to the present invention;

FIG. 7 is a schematic front view, partly cut away, showing the third embodiment of the present invention;

FIG. 8 is a schematic diagram for explaining the third embodiment depicted in FIGS. 6 and 7;

FIG. 11 is a longitudinal-sectional view schematically illustrating a fifth embodiment of the pseudo-luminous panel according to the present invention;

FIG. 12 is a schematic front view, partly cut away, showing the fifth embodiment of the present invention;

FIG. 15 is a longitudinal-sectional view schematically illustrating a seventh embodiment of the pseudo-luminous panel according to the present invention;

FIG. 16 is a schematic front view, partly cut away, showing the seventh embodiment of the present invention;

FIG. 19 is a longitudinal-sectional view schematically illustrating a first embodiment of the substrate for the pseudo-luminous panel according to the present invention;

FIG. 20 is a schematic front view, partly cut away, showing the first embodiment of the substrate according to the present invention;

FIG. 27 is a longitudinal-sectional view schematically illustrating a fifth embodiment of the substrate according to the present invention;

FIG. 28 is a schematic front view, partly cut away, showing the substrate depicted in FIG. 27;

FIG. 29 is a longitudinal-sectional view schematically illustrating a sixth embodiment of the substrate according to the present invention;

FIG. 30 is a schematic front view, partly cut away, showing the substrate depicted in FIG. 29;

FIG. 39 and 40 are schematic longitudinal-sectional views showing a conventional pseudo-luminous panel.

DESCRIPTION OF THE PREFERRED EMBODIMENTS

Embodiment 1

Referring now to FIGS. 1 and 2, a first embodiment of the pseudo-luminous panel, identified generally by Q, according to the present invention will be described, which comprises a substrate 1 and a thin film optical color filter 3 formed all over the main surface 2 of the substrate 1.

The main surface 2 of the substrate 1 includes obliquely downward and upward band-like surface portions 2A and 2B which are alternately arranged side by side in the vertical direction. The obliquely downward band-like surface portions 2A are each formed by a smooth reflecting surface SR which is concave in the longitudinal section of the panel Q and extends straight widthwise of the panel Q as indicated by CL. The obliquely upward band-like surface portions 2B are each formed by a smooth reflecting surface SR which extends in a flat plane.

Obliquely downward band-like surface portions 4A of the surface 4 of the thin film optical color filter 3 on the obliquely downward band-like surface portions 2A of the substrate 1, forming the surface 4 of the thin film optical color filter 3 on the opposite side from the substrate 1, are each formed by a smooth surface S which extends straight in the longitudinal section of the panel Q and extends straight widthwise of the panel Q as indicated by LL. Therefor the obliquely band-like surface potions 4A of the surface of the color filter 3 are smooth and flat surface SF. Obliquely band-like surface portions 4B of the surface 4 of the thin film optical color filter 3 on the obliquely downward band-like surface portions 2B of the substrate 1, forming the surface 4 of the thin film optical color filter 3 on the opposite side from the substrate 1, are each formed by a rough surface K which extends in a flat plane.

Figure 3:
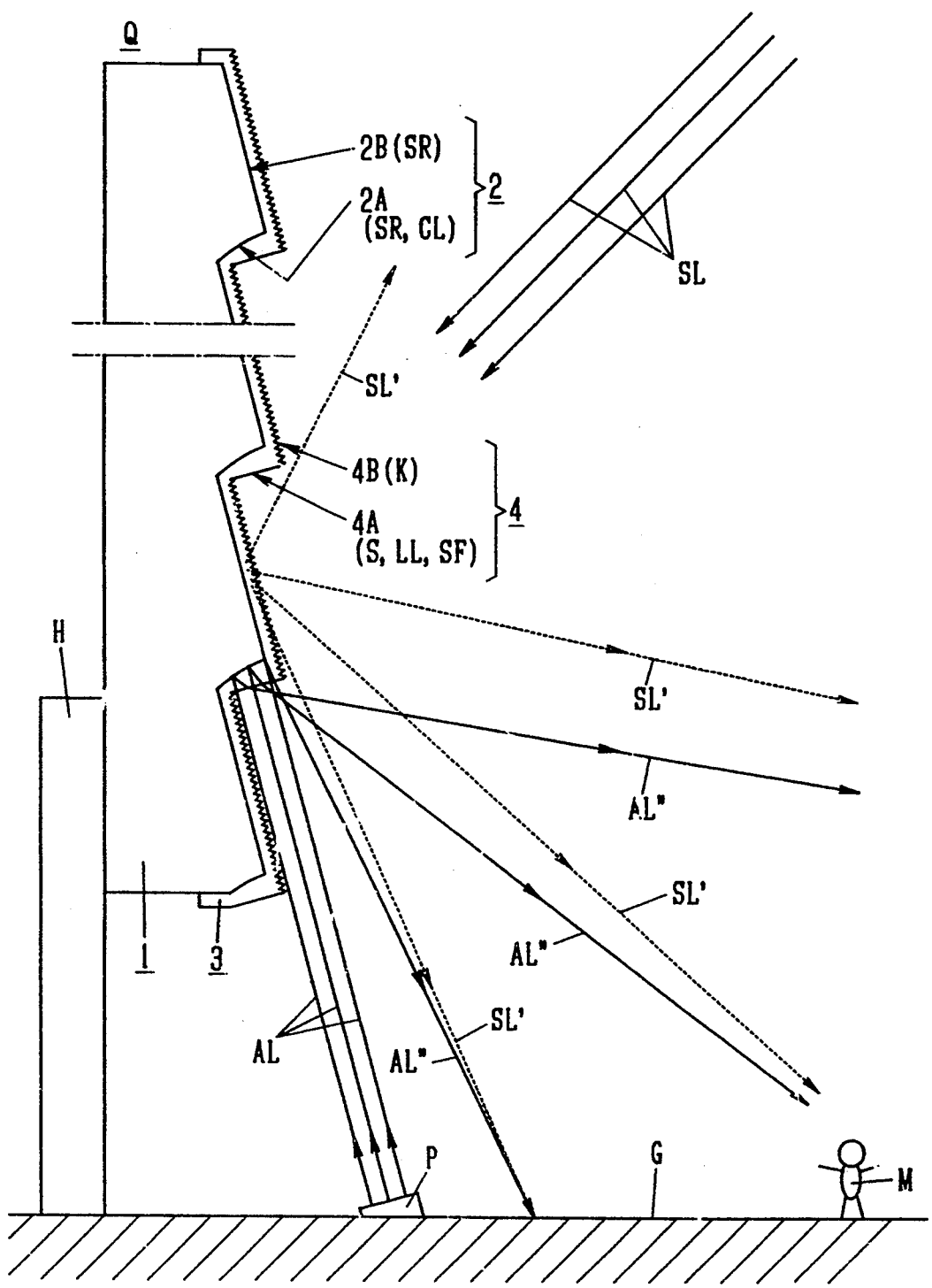
FIG. 3 is a schematic diagram for explaining the first embodiment depicted in FIGS. 1 and 2.

In the case where the pseudo-luminous panel Q of the above construction is disposed outdoors, for example, high above the ground G and in such a manner that the main surface 2 of the substrate 1 extends in the vertical plane, by use of a support H as shown in FIG. 3, sunlight SL directly strikes the obliquely upward band-like surface portions 4B of the color filter 3 but hardly falls on the obliquely downward band-like surface portions 4A of the color filter 3. In this case, the sunlight SL enters into the thin film optical color filter 3 through the surface portions 4B and then into the obliquely upward band-like surface portions 2B of the main surface 2 of the substrate 1. Since the surface portions 4B are each formed by the rough surface K, the sunlight SL incident to the obliquely upward band-like surface portions 4B of the color filter 3 irregularly enters into the filter 3 itself and is irregularly reflected by the surface portions 2B of the substrate 1. Thus irregularly reflected light passes again through the thin film optical color filter 3 and its obliquely upward band-like surface portions 4B and is then emitted as scattered light SL' from the pseudo-luminous panel Q.

The scattered light SL' has passed through the thin film optical color filter 3, and hence has a hue based on the pass band of the color filter 3 in terms of its band-pass characteristic. A portion of the scattered light SL' is directed toward the ground G. Consequently, in the daytime a pattern of the main surface 2 of the substrate 1 can be seen by a viewer M from the ground G in the hue based on the pass band of the color filter 3.

By setting a projector P on the ground G and suitably selecting the position of the projector P relative to the pseudo-luminous panel Q for illumination with the artificial light AL at night, the artificial light AL mostly strikes the obliquely downward band-like surface portions 4A of the thin film optical color filter 3. The artificial light AL striking the surface portions 4A enters therefrom into the thin film optical color filter 3 and then into the obliquely downward band-like surface portions 2A of the substrate 1. In this instance, since the surface portions 2A are the smooth reflecting surfaces SR, the incident light is hardly irregularly reflected and is directly reflected obliquely downward. Thus reflected light passes again through the color filter 3 and its obliquely downward band-like surface portions 4A and is emitted obliquely downward as directly reflected light AL" from the pseudo-luminous panel Q.

The reflected light AL" thus emitted diagonally below the panel Q has passed through the thin film optical color filter 3, and hence has a hue based on the pass band or band-pass characteristic of the color filter 3. Hence, a pattern of the main surface 2 of the substrate 1 can be seen at night by the viewer M from a position diagonally below the panel Q in the hue based on the pass band or band-pass characteristic of the color filter 3.

Thus, according to the pseudo-luminous panel Q of the present invention depicted in FIGS. 1 and 2, when it is disposed high above the ground G so that it is irradiated by the sunlight SL in the daytime and by the artificial light AL at night, as in the case of the conventional pseudo-luminous panel described previously in respect of FIGS. 39 and 40, the pattern of the main surface 2 of the substrate 1 can always be seen from the position diagonally below the panel Q in the hue based on the band-pass characteristic or pass band of the color filter 3.

As referred to previously, there is a great difference in energy between the sunlight SL and the artificial light AL which strike the pseudo-luminous panel Q. In the daytime the viewer M perceives the pattern of the main surface 2 of the substrate 1 by a portion of the scattered light SL', whereas at night he sees the pattern by the directly or regularly reflected light AL".

On this account, when the reflectivity of the substrate 1 is made relatively high by a suitable selection of its material so that the pattern of the main surface 2 of the substrate 1 can be seen distinctly at night, the pattern in the day time does not become dazzling and can be seen clearly in the hue based on the band-pass characteristic or pass band of the thin film optical color filter 3. Also when the reflectivity of the substrate 1 is made low by a suitable selection of its material so that the pattern of the main surface 2 of the substrate 1 is not dazzling in the daytime, the pattern can clearly be seen at night in the hue based on the band-pass characteristic or pass band of the color filter 3.

Furthermore, the obliquely downward band-like surface portions 2A forming the main surface 2 of the substrate 1 are each formed by the smooth reflecting surface SR, which is concave in longitudinal section of the panel Q and extends straight widthwise of the panel Q as mentioned previously. With such a structure, the reflected light AL" emerging from the panel Q does not unnecessarily spread wide in the lateral direction, and consequently, the area diagonally to the front of the panel Q where the pattern of the main surface 2 of the substrate 1 can be seen is limited to some extent, but the pattern can be viewed distinctly from such a modestly limited area.

In the case of the pseudo-luminous panel Q of this embodiment, the substrate 1 can be made substantially hard but may also be fabricated as a flexible sheet, hence the pseudo-luminous panel Q can be provided as a flexible sheet. The flexible pseudo-luminous panel Q can be rolled up when it is not used. And when it is used outdoors as mentioned previously, it needs only to be put up on a support H or the like. The flexible pseudo-luminous panel Q can be held in the rolled-up form and hence is easy to handle when it is not used.

With the pseudo-luminous panel Q of FIGS. 1 and 2 according to the first aspect of the present invention, the sunlight SL falling on the obliquely upward band-like surface portions 4B of the thin film optical color filter 3 as mentioned above irregularly enters into the thin film optical filter 3. In this case, the sunlight SL is partly reflected by the obliquely upward band-like surface portions 4B of the optical color filter 3. If the obliquely upward band-like surface portions 4B of the optical color filter 3 are not rough, the partly reflected sunlight will be directed downward obliquely to the pseudo-luminous panel Q. Incidentally, such partly reflected sunlight has not passed through the thin film optical color filter 3, and hence has the hue of the sunlight SL (i.e. a white hue), in which case the pattern of the main surface 2 of the substrate 1 will be seen with a low degree of saturation and in the hue corresponding to the pass band of the thin film optical color filter 3 but affected by the hue of the sunlight SL. In the pseudo-luminous panel Q shown in FIGS. 1 and 2, however, since the obliquely upward band-like surface portions 4B of the thin film optical color filter 3 are rough, the sunlight SL falling on them is partly reflected back as scattered light SL', and hence is hardly directed downward obliquely to the pseudo-luminous panel Q. Consequently, the pattern of the main surface 2 of the substrate 1 can be displayed with a high degree of saturation and in the hue corresponding to the pass band of the thin film optical color filter 3 which substantially unaffected by the hue of the sunlight SL.

Moreover, in the case of the pseudo-luminous panel Q of this embodiment, the artificial light AL applied directly to the obliquely downward band-like surface portions 4A of the thin film optical color filter 3 as mentioned above enters thereinto. In this case, the artificial light AL is partly reflected by the obliquely downward bank-like surface portions 4A of the color filter 3. Also in this instance, if the obliquely downward band-like surface portions 4A of optical filter 3 are not smooth, the partly reflected light will be directed downward obliquely to the pseudo-luminous panel Q and it has the hue of the artificial light AL because it has not passed through the color filter 3. Hence, the pattern of the main surface 2 of the substrate 1 will be seen, at night, with a low degree of saturation and in the hue corresponding to the pass band of the color filter 3 but affected by the hue of the artificial light AL. In the pseudo-luminous panel Q of this embodiment, however, since the obliquely downward bank-like surface portions 4A which form the surface of the thin film optical color filter 3 on the opposite side from the substrate 1 are smooth flat plane surfaces linearly extending in the longitudinal and lateral sections of the panel, the pattern of the main surface 2 of the substrate 1 can be displayed with a high degree of saturation and in the hue corresponding to the pass band of the thin film optical color filter 3, substantially unaffected by the hue of the artificial light AL, by suitably selecting the direction of application of the artificial light AL, the position of the projector P so that the artificial light AL from the projector P strikes the above-said smooth obliquely downward band-like surface portions 4A perpendicularly thereto and is partly reflected back to the projector P, not to the viewer M on the ground G.

Thus, the pseudo-luminous panel Q of this embodiment permits the pattern of the main surface 2 of the substrate 1 to be displayed with a high degree of saturation and in the hue corresponding to the thin film optical color filter 3 both in the daytime and at night.

Moreover, in the case of the pseudo-luminous panel Q of this embodiment, however, the obliquely downward band-like surface portions 2A, which form the main surface 2 of the substrate 1, are smooth surfaces SR which are concave in the longitudinal section of the panel Q and extend straight widthwise of the panel Q, as indicated by CL. By a suitable selection of the degree and direction of their concavity, a reflected version of the artificial light AL from the obliquely downward band-like surface portions 2A of the substrate 1 can be emitted to the outside of the panel Q downward obliquely thereto through only the obliquely downward band-like surface portions 4A of the thin film optical filter 3, without the passage through its obliquely upward rough surface portions 4B, and in addition, the reflected light thus emitted diagonally downward from the panel Q is permitted to spread over a wide angular range in the vertical direction. This prevents that the reflected version of the artificial light AL from the obliquely downward band-like surface portions 2A of the substrate 1 passes through the obliquely upward rough surface portions 4B of the thin film optical color filter 3 and is emitted as scattered light from the panel Q and the scattered light is partly directed downward obliquely AL thereto, and that the reflected version of the artificial light AL from the obliquely downward surface portions 2A of the substrate 1 is emitted from the panel Q obliquely downward thereto but does not spread over a wide angular range.

Thus, the pseudo-luminous panel Q of this embodiment allows the pattern of the main surface 2 of the substrate 1 to be seen at night with a high degree of lightness and in the hue corresponding to the pass band of the thin film optical color filter 3 from the ground G over a wide positional range in front of the panel Q.

Embodiment 2

Figure 5:
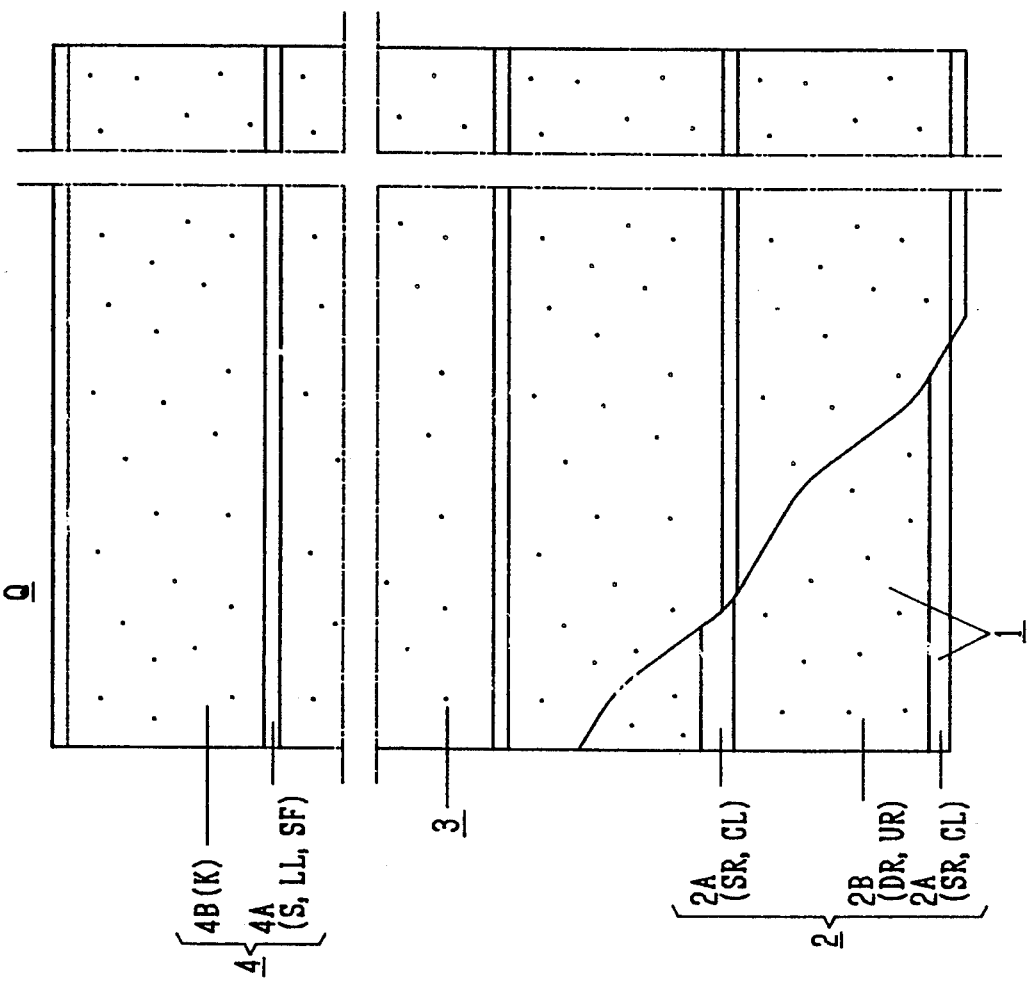
FIG. 5 is a front view, partly cut away, schematically showing the second embodiment of the present invention.
Figure 4:
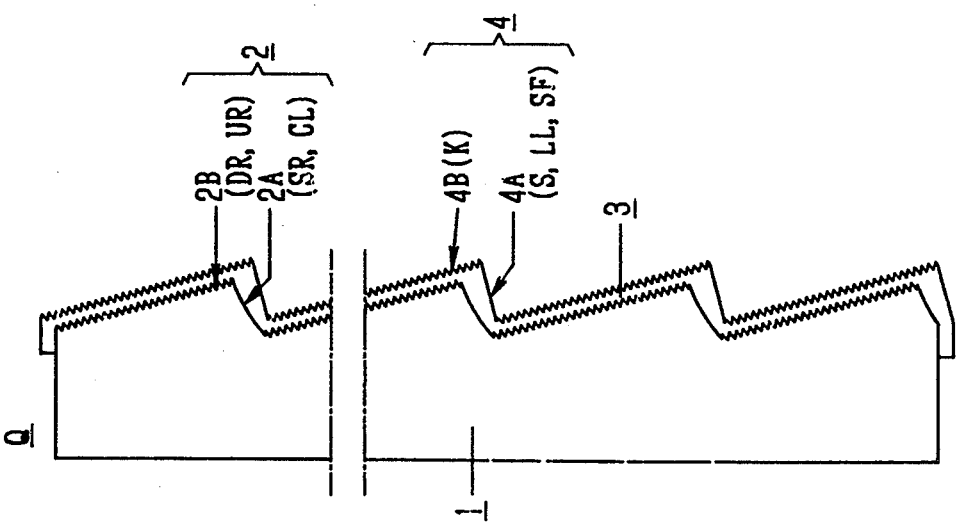
FIG. 4 is longitudinal-sectional view schematically illustrating a second embodiment of the pseudo-luminous panel according to the present invention.

Turning next to FIGS. 4 and 5, a second embodiment of the pseudo-luminous panel Q according to the present invention will be described. The parts corresponding to those in FIGS. 1 and 2 are identified by the same reference numerals and no detailed description thereof will be repeated.

The pseudo-luminous panel Q of this example is identical in construction with the first embodiment shown in FIGS. 1 and 2 except that the obliquely upward band-like surface portions 2B forming the main surface 2 of the substrate 1 are each formed by an irregular reflecting surface DR or uneven surface UR, not the smooth surface SR extending in the flat plane in the first embodiment.

With the pseudo-luminous panel Q of such a structure, it is possible to obtain the same results as those obtainable with the first embodiment described above in respect of FIGS. 1 and 2.

In this embodiment, however, since the obliquely upward band-like surface portions 2B forming the main surface 2 of the substrate 2 are each formed by the irregular reflecting surface DR or uneven surface UR, the sunlight SL incident on the color filter 3 irregularly enters thereinto and is irregularly reflected by the obliquely upward band-like surface portions 2B of the main surface 2 of the substrate 1 back to the front of the panel Q through the color filter 3, thereafter being irregularly emitted from the panel Q. In this case, the scattered light SL' is more scattered than in the case of the first embodiment.

Hence, even if in the case of the panel Q of the first embodiment the pattern of the substrate 1 is dazzling owing to relatively high intensity of the sunlight SL in the daytime, it is possible, with the panel Q of this embodiment, to provide a non-glare display of the pattern the hue based on the band-pass characteristic or pass band of the color filter 3.

Embodiment 3

Referring now to FIGS. 6 and 7, a third embodiment of the pseudo-luminous panel Q according to the present invention will be described. The parts corresponding to those in FIGS. 1 and 2 are identified by the same reference numerals and no detailed description thereon will be repeated.

The pseudo-luminous panel of this embodiment is identical in construction with the panel of the first embodiment shown in FIGS. 1 and 2 except that the obliquely downward band-like surface portions 2A of the substrate 1 are each formed by the smooth reflecting surface SR which is a surface CV which is concave in the longitudinal direction of the panel Q and repeatedly protrudes forward in the cross-section of the panel Q, and that the obliquely downward band-like surface portions 4A of the thin film optical color filter 3 are each formed by a smooth surface S which is a surface LV which extends straight in the longitudinal section of the panel Q and repeatedly protrudes forward in the cross-section of the panel Q.

It is evident that the pseudo-luminous panel Q of this embodiment produces the same effects as those obtainable with the first embodiment shown in FIGS. 1 and 2, though not described in detail.

In this embodiment, since the obliquely downward band-like surface portions 2A forming the main surface 2 of the substrate 1 are each the smooth surface SR which is concave in the longitudinal section of the panel Q and repeatedly protrudes forward in the cross-section of the panel Q, as indicated by CV, the reflected light AL" emerging forwardly downward from the panel Q spreads to the right and left, i.e. in the lateral or widthwise direction of the panel Q, as shown in FIG. 8. By properly selecting the convexities of each protruded surface of the surface CV, it is possible to essentially lift restrictions on the area from which the pattern of the main surface 2 of the substrate 1 can be seen in the lateral direction relative to the panel Q.

Embodiment 4

Figure 10:
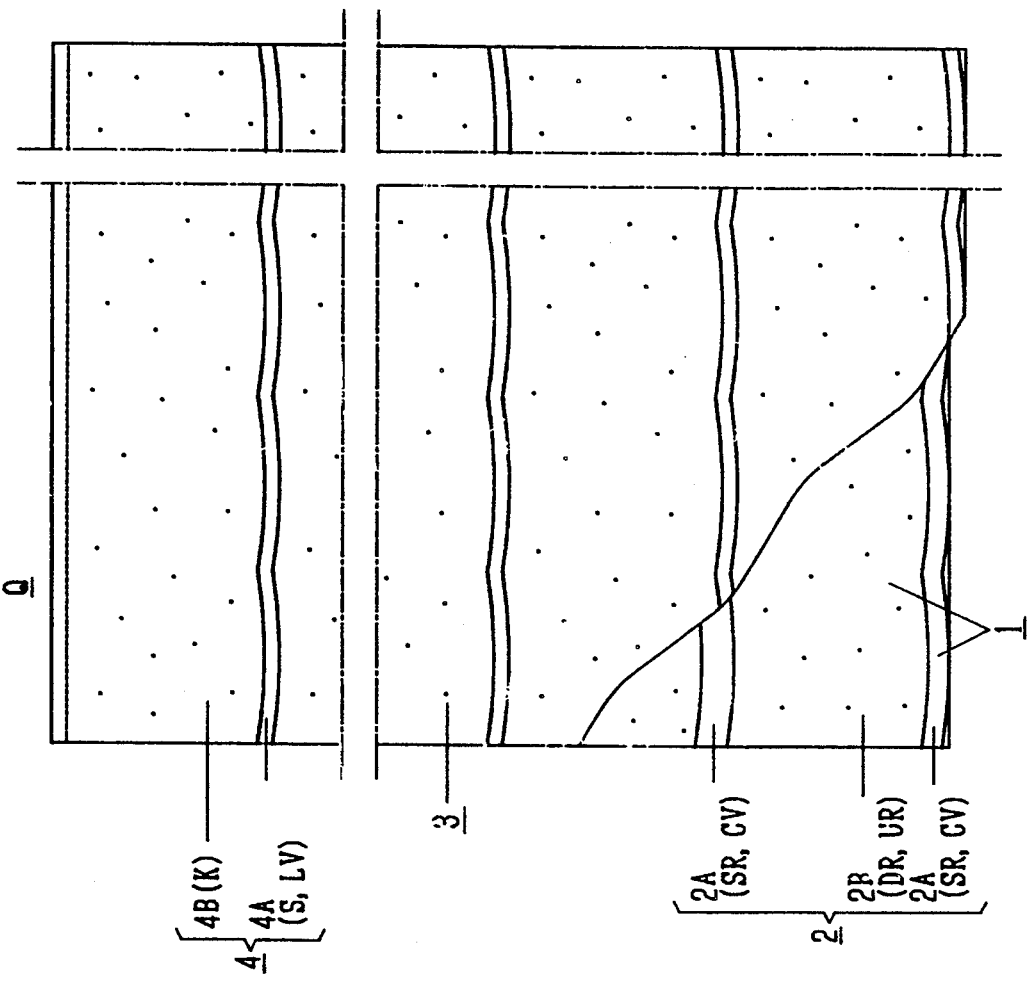
FIG. 10 is a schematic front view, partly out away, showing the fourth embodiment of the present invention.
Figure 9:
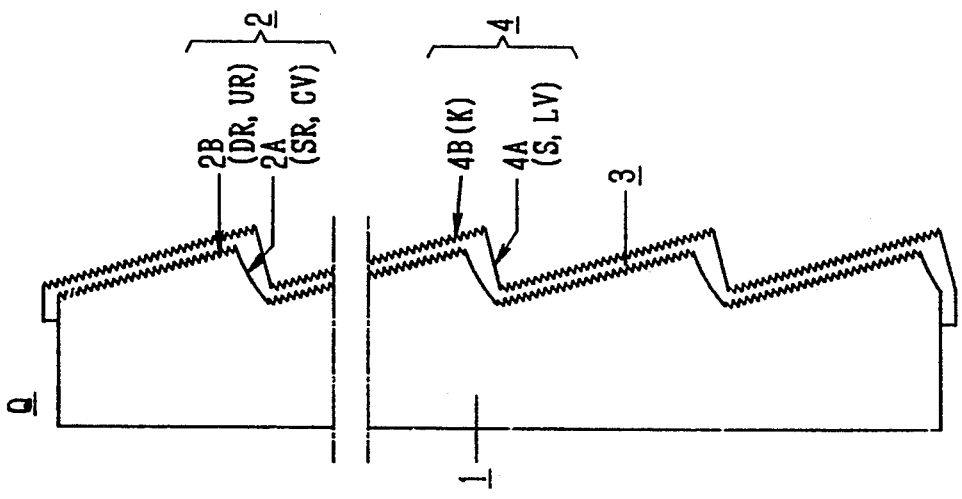
FIG. 9 is a longitudinal-sectional view schematically illustrating a fourth embodiment of the pseudo-luminous panel according to the present invention.

With reference to FIGS. 9 and 10, a fourth embodiment of the pseudo-luminous panel Q according to the present invention will be described. The parts corresponding to those in FIGS. 6 and 7 are identified by the same reference numerals, and no detailed description will be given thereof.

The pseudo-luminous panel Q of this embodiment is identical in construction with the panel Q of the third embodiment shown in FIGS. 6 and 7 except that in the latter the obliquely upward band-like surface portions 2B of the substrate 1 are each formed by the smooth reflecting surface SR, whereas in the former the surface portions 2B are each formed by the irregular or uneven reflecting surface DR or UR as in the case of the second embodiment described above in respect of FIGS. 4 and 5.

It is evident that the pseudo-luminous panel Q of this embodiment produces the same effects as those obtainable with the panels Q of the second and third embodiments described previously in connection with FIGS. 4 and 5 and 6 and 7, respectively.

Embodiment 5

Referring now to FIGS. 11 and 12, a fifth embodiment of the pseudo-luminous panel Q according to the present invention will be described. The parts corresponding to those in FIGS. 1 and 2 are identified by the same reference numerals and no detailed description will be given thereof.

The pseudo-luminous panel Q of this embodiment comprises the substrate 1, a reflecting film 5 formed all over the main surface 2 of the substrate 1, and the thin film optical color filter 3 formed all over the surface 6 of the reflecting film 5 on the opposite side from the substrate 1.

As is the case with the first embodiment described previously in respect of FIGS. 1 and 2, the main surface 2 of the substrate 1 has the obliquely downward band-like surface portions 2A and the obliquely upward band-like surface portions 2B alternately arranged side by side in the vertical direction.

The surface portions 2A are each formed by the smooth surface S, which is concave in the longitudinal section of the panel Q and extends straight widthwise of the panel Q as indicated by CL. The surface portions 2B are each formed by the smooth surface S which extends in a plane.

Obliquely downward band-like surface portions 6A on the corresponding similarly shaped surface portions 2A of the substrate 1, forming the surface 6 of the reflecting film 5 on the opposite side from the substrate 1, are each formed by the smooth reflecting surface SR as in the case of the surface portion 2A in the first embodiment described conjunction with FIGS. 1 and 2, and the surface SR is concave in the longitudinal section of the panel Q and extends straight widthwise of the substrate 1 in conformity with the underlying the surface portion 2A of the substrate 1 as indicated by CL.

The obliquely upward band-like surface portions 6B on the similarly shaped surface portions 2B of the substrate 2, forming the surface 6 of the reflecting film 5 on the opposite side from the substrate 1, are each formed by the smooth reflecting surface SR extending in a plane as in the case of the surface portion 2B of the first embodiment shown in FIGS. 1 and 2.

The obliquely downward band-like surface portions 4A on the similarly shaped surface portions 6A of the reflecting film 5, forming the surface 4 of the thin film optical color filter 3 on the opposite side from the reflecting film 5, are each formed by the smooth surface S, which is a surface LL extending straight widthwise of the panel in conformity with the underlying the surface portion 6A as indicated by SF.

Furthermore, the obliquely upward band-like surface portions 4B on the similarly shaped surface portions 6B of the reflecting film 5, forming the surface 4 of the thin film optical color filter 3 on the opposite side from the reflecting film 5, are each formed by the rough surface K as in the case of the pseudo-luminous panel described previously with reference to FIGS. 1 and 2.

With the pseudo-luminous panel Q of this embodiment, since the surface 6 of the reflecting film 5 corresponds with the main surface 2 of the substrate 1 in the pseudo-luminous panel Q of the first embodiment shown in FIGS. 1 and 2, it is possible to obtain the same effects as those obtainable with the first embodiment shown in FIGS. 1 and 2.

Embodiment 6

Figure 14:
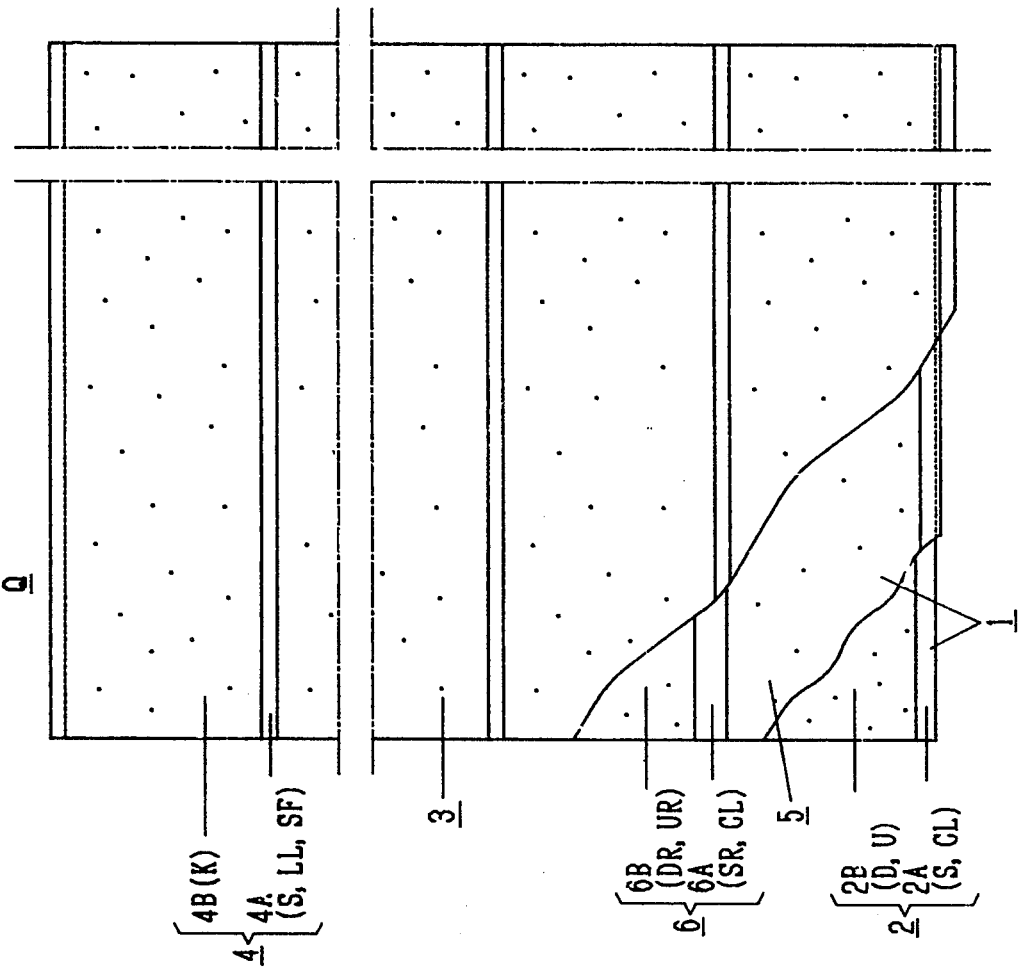
FIG. 14 is a schematic front view, partly cut away, showing the sixth embodiment of the present invention.
Figure 13:
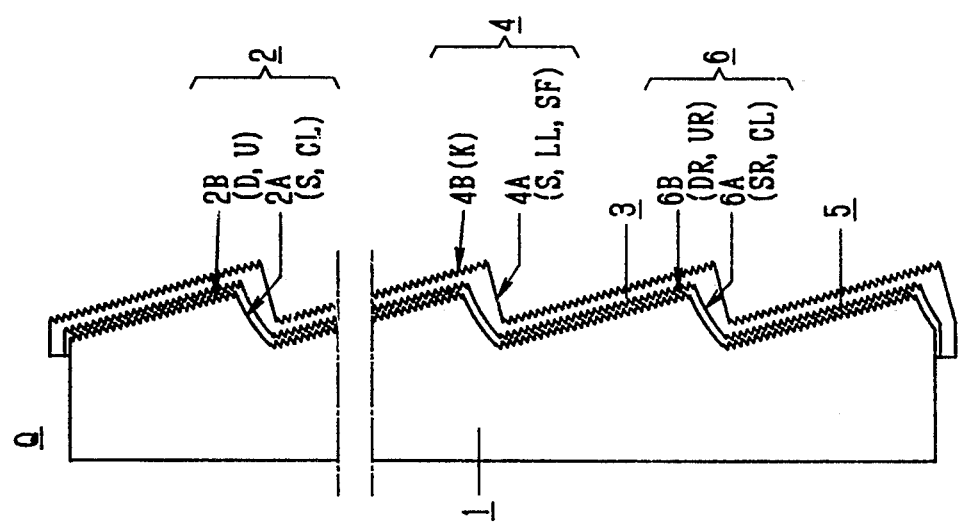
FIG. 13 is a longitudinal-sectional view schematically illustrating a sixth embodiment of the pseudo-luminous panel according to the present invention.

Turning next to FIGS. 13 and 14, a sixth embodiment of the pseudo-luminous panel Q according to the present invention will be described. The parts corresponding to those in FIGS. 11 and 12 are identified by the same reference numerals and no detailed description will be given thereof.

The pseudo-luminous panel Q of this embodiment is identical in construction with the fifth embodiment shown in FIGS. 11 and 12 except that in the latter the obliquely upward band-like surface portions 2B of the substrate 1 are each formed by the smooth surface S extending in a plane, whereas in the former the surface portions 2B are each formed by the irregular or uneven surface D or U and that in the latter the obliquely upward band-like surface portions 6B of the reflecting film 5 are each smooth reflecting surface SR extending in a plane, whereas in the former the obliquely upward band-like surface portions 6B of the reflecting film 5 are each the irregular or uneven surface DR or UR as i n the case of the obliquely upward band-like surface portions 2B of the substrate 1 of the panel depicted in FIGS. 4 and 6.

It is evident that the pseudo-luminous panel of the above structure produces the same effects as those obtainable with the embodiment of FIGS. 11 and 12 and the embodiment of FIGS. 4 and 5.

Embodiment 7

Referring next to FIGS. 15 and 16, a seventh embodiment of the pseudo-luminous panel Q according to the present invention will be described. The parts corresponding to those in FIGS. 11 and 12 are identified by the same reference numerals and no detailed description will be given thereof.

The pseudo-luminous panel Q of this embodiment is identical in construction with the fifth embodiment shown in FIGS. 11 and 12 except that, as in the case of the third embodiment shown in FIGS. 6 and 7, the obliquely downward band-like surface portions 2A of the substrate 1 are each formed by the smooth surface S which is also a surface CV concave in the longitudinal section of the panel Q and convex forward at regular intervals widthwise of the panel Q in its cross-section, that the obliquely downward band-like surface portions 6A of the reflecting film 6 are each similarly formed by the smooth reflecting surface SR which is also a surface CV concave in the longitudinal section of the panel Q and convex forward at regular intervals widthwise of the panel Q in its cross-section, and that the obliquely downward band-like surface portions 4A of the thin film optical color filter 3 are each similarly formed by the smooth surface S which is also a surface LV extending straight in the longitudinal section of the panel Q and convex forward at regular intervals widthwise of the panel Q in its cross-section.

It is therefore evident that the pseudo-luminous panel Q of this embodiment brings the same effects as those by the embodiment of FIGS. 11 and 12 and the embodiment of FIGS. 6 and 7.

Embodiment 8

Figure 18:
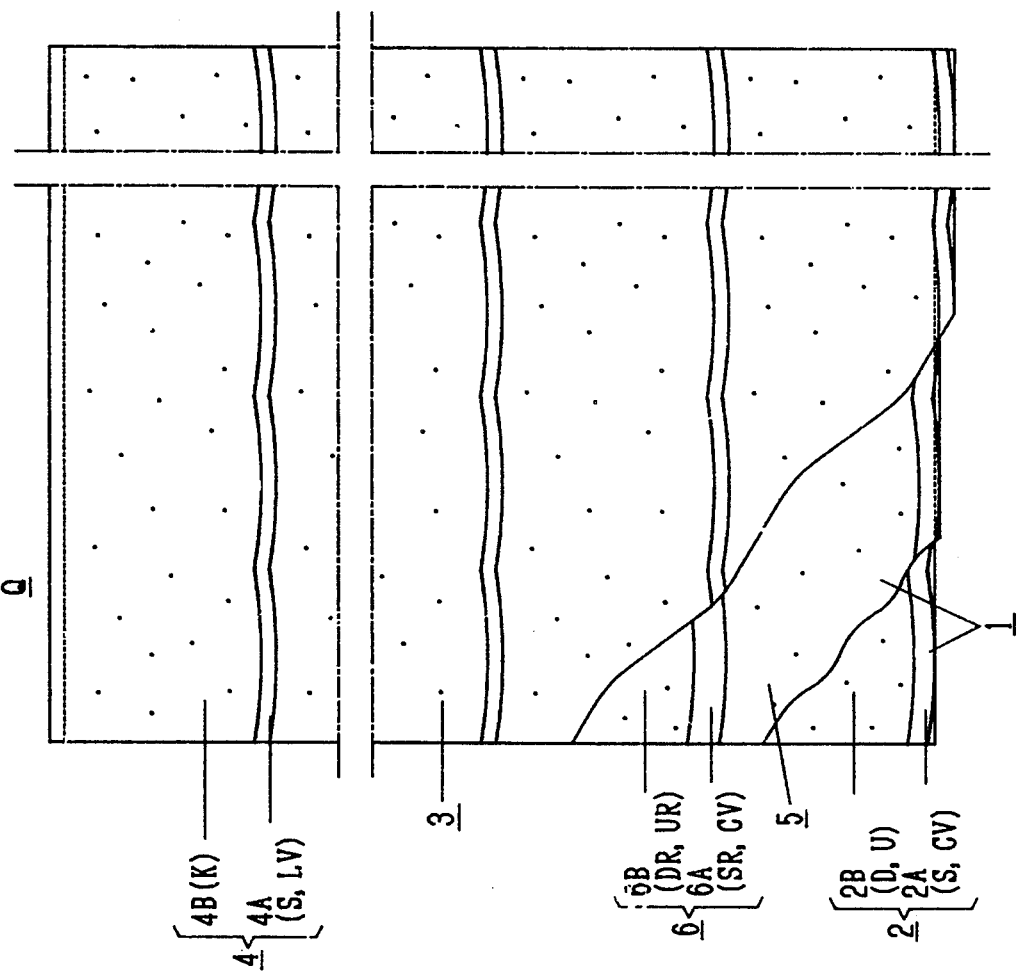
FIG. 18 is a schematic front view, partly cut away, showing the eighth embodiment of the present invention.
Figure 17:
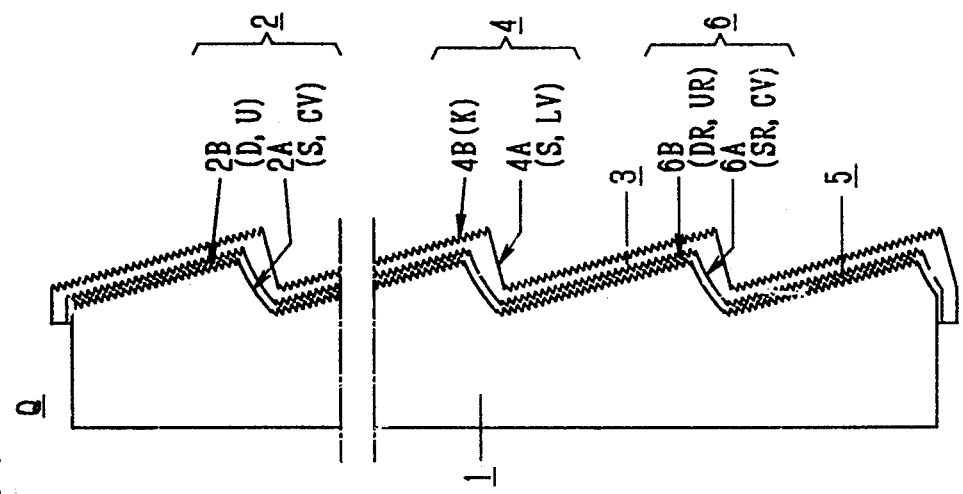
FIG. 17 is a longitudinal-sectional view schematically illustrating an eighth embodiment of the pseudo-luminous panel according to the present invention.

Turning next to FIGS. 17 and 18, an eighth embodiment of the pseudo-luminous panel Q according to the present invention will be described. The parts corresponding to those in FIGS. 15 and 16 are identified by the same reference numerals and no detailed description will be given thereof.

The pseudo-luminous panel Q of this embodiment is identical in construction with the seventh embodiment shown in FIGS. 15 and 16 except that the obliquely upward band-like surface portions 2B of the substrate 1 are each formed by the irregular surface D or uneven surface U and that the obliquely upward band-like surface portions 6B of the reflecting film 5 are each formed by the irregular or uneven surface DR or UR as in the case of the sixth embodiment described previously in connection with FIGS. 13 and 14.

Hence it is evident that the pseudo-luminous panel of the above structure brings the same effects as those by the seventh embodiment of FIGS. 15 and 16 and the sixth embodiment of FIGS. 13 and 14.

Embodiment 9

Turning next to FIGS. 19 and 20, a first embodiment of the substrate for the pseudo-luminous panel according to the present invention will be described. The parts corresponding to those in FIGS. 1 and 2 are identified by the same reference numerals and no detailed description will be given thereof.

The substrate, indicated generally by B in FIGS. 19 and 20, is identical in construction with the first embodiment of FIGS. 1 and 2 except that the thin film optical color filter 3 in the latter is omitted.

Hence, the pseudo-luminous panel Q of the present invention, described previously in conjunction with FIGS. 1 and 2, can be obtained simply by forming its thin film optical color filter 3 all over the main surface 2 of the substrate 1.

Accordingly, the use of the substrate B shown in FIGS. 19 and 20 will allow easy fabrication of the pseudo-luminous panel Q of the present invention which has the excellent effects described previously with respect to FIGS. 1 and 2.

Embodiment 10

Figure 22:
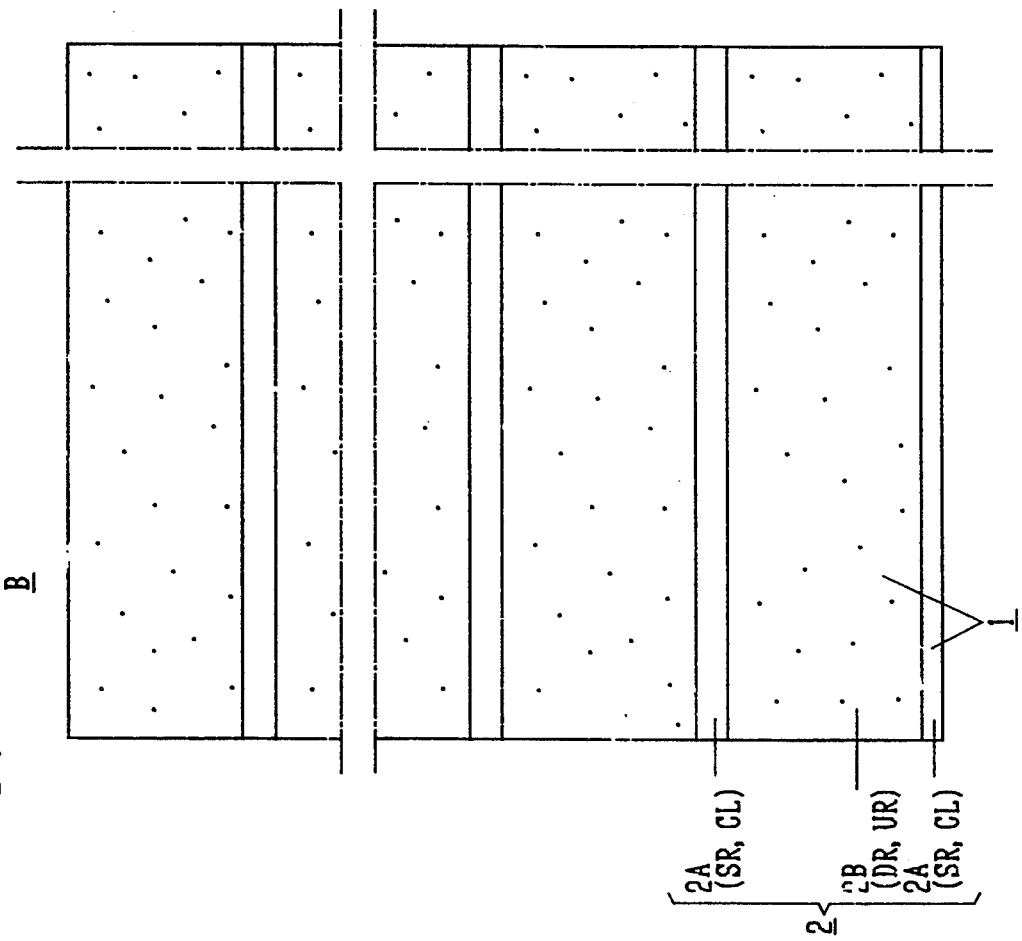
FIG. 22 is a schematic front view, partly cut away, showing the substrate depicted in FIG. 21.
Figure 21:
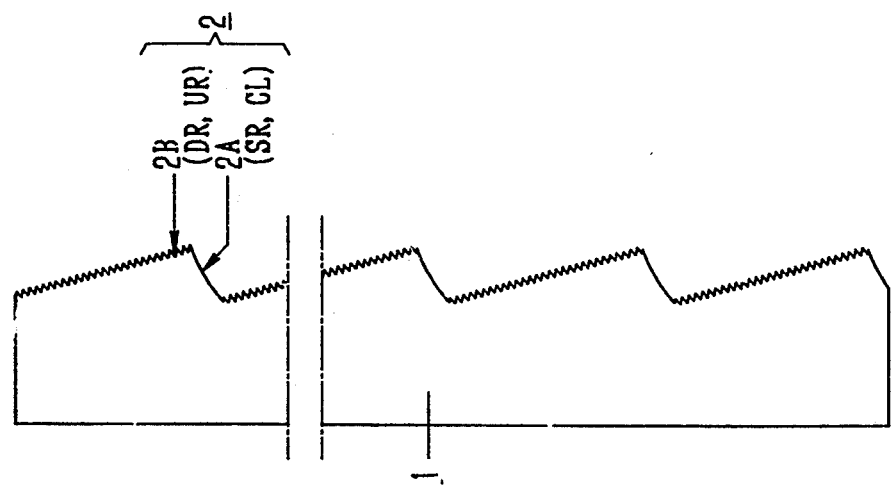
FIG. 21 is a longitudinal-sectional view schematically illustrating a second embodiment of the substrate according to the present invention.

Referring next to FIGS. 21 and 22, a second embodiment of the substrate B for the pseudo-luminous panel Q according to the present invention will be described. The parts corresponding to those in FIGS. 4 and 5 are identified by the same reference numerals and no detailed description will be given thereof.

The substrate B of this embodiment is identical in construction with the second embodiment of the pseudo-luminous panel Q shown in FIGS. 4 and 5 except that the thin film optical color filter 3 in the latter is omitted.

Hence, the pseudo-luminous panel Q of the present invention, described previously in conjunction with FIGS. 4 and 5, can be obtained simply by forming its thin film optical color filter 3 all over the main surface 2 of the substrate 1.

Accordingly, the use of the substrate B shown in FIGS. 21 and 22 will allow easy fabrication of the pseudo-luminous panel Q of the present invention which has the excellent effects described previously with respect to FIGS. 4 and 5.

Embodiment 11

Figure 24:
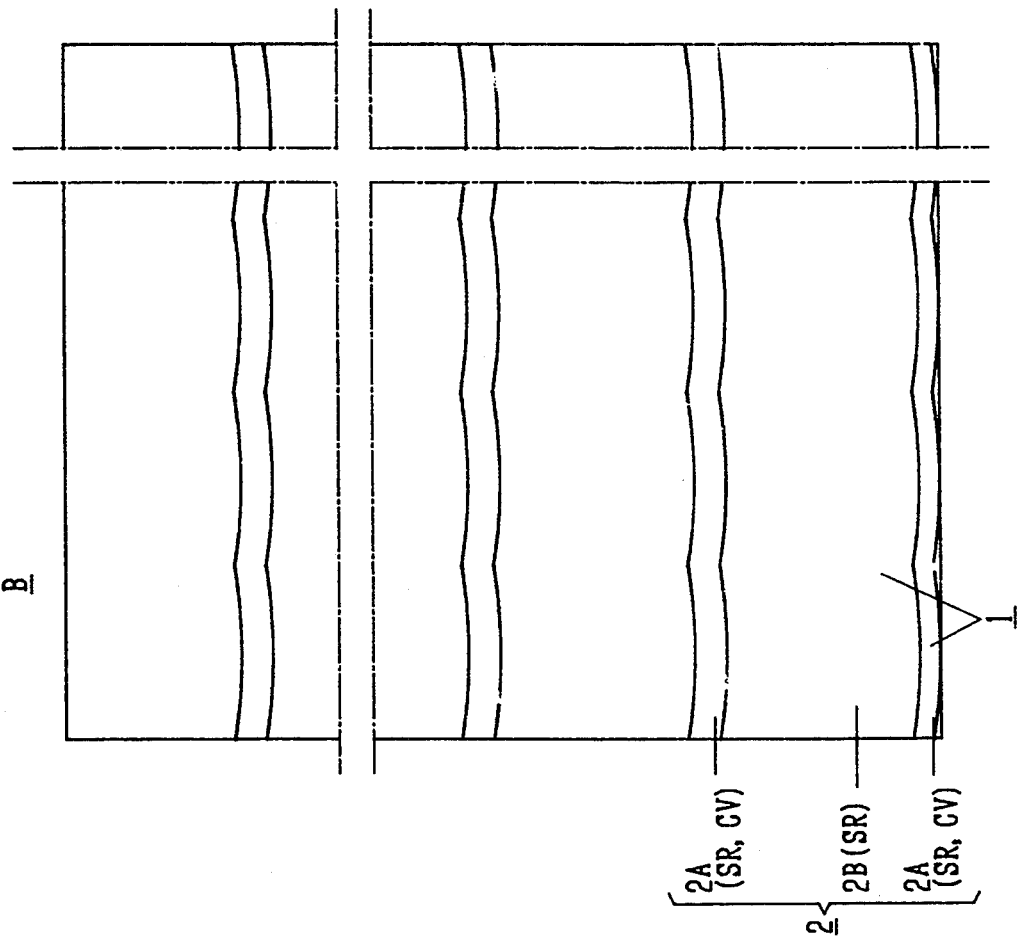
FIG. 24 is a schematic front view, partly cut away, showing the substrate depicted in FIG. 23.
Figure 23:
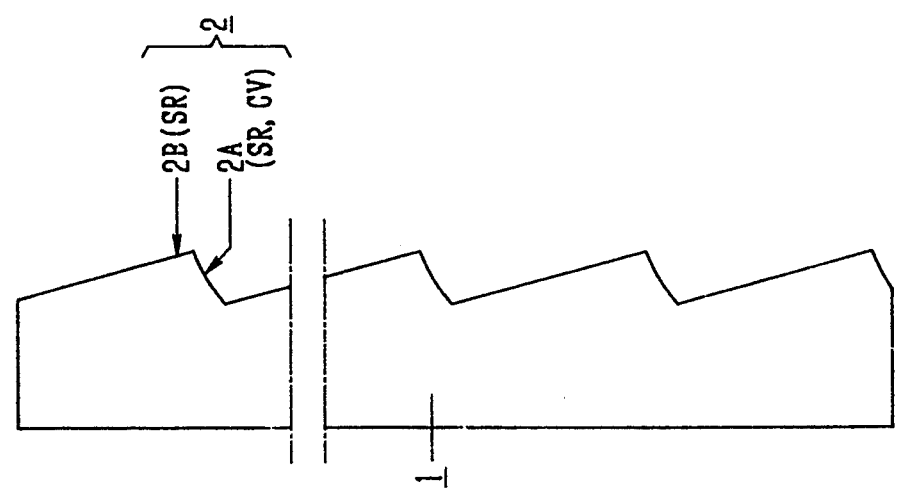
FIG. 23 is a longitudinal-sectional view schematically illustrating a third embodiment of the substrate according to the present invention.

Referring next to FIGS. 23 and 24, a third embodiment of the substrate B for the pseudo-luminous panel Q according to the present invention will be described. The parts corresponding to those in FIGS. 6 and 7 are identified by the same reference numerals and no detailed description will be given thereof.

The substrate B of this embodiment is identical in construction with the third embodiment of the pseudo-luminous panel Q shown in FIGS. 6 and 7 except that the thin film optical color filter 3 in the latter is omitted.

Hence, the pseudo-luminous panel Q of the present invention, described previously in conjunction with FIGS. 6 and 7, can be obtained simply by forming its thin film optical color filter 3 all over the main surface 2 of the substrate 1.

Accordingly, the use of the substrate B shown in FIGS. 23 and 24 will allow easy fabrication of the pseudo-luminous panel Q of the present invention which has the excellent effects described previously with respect to FIGS. 6 and 7.

Embodiment 12

Figure 26:
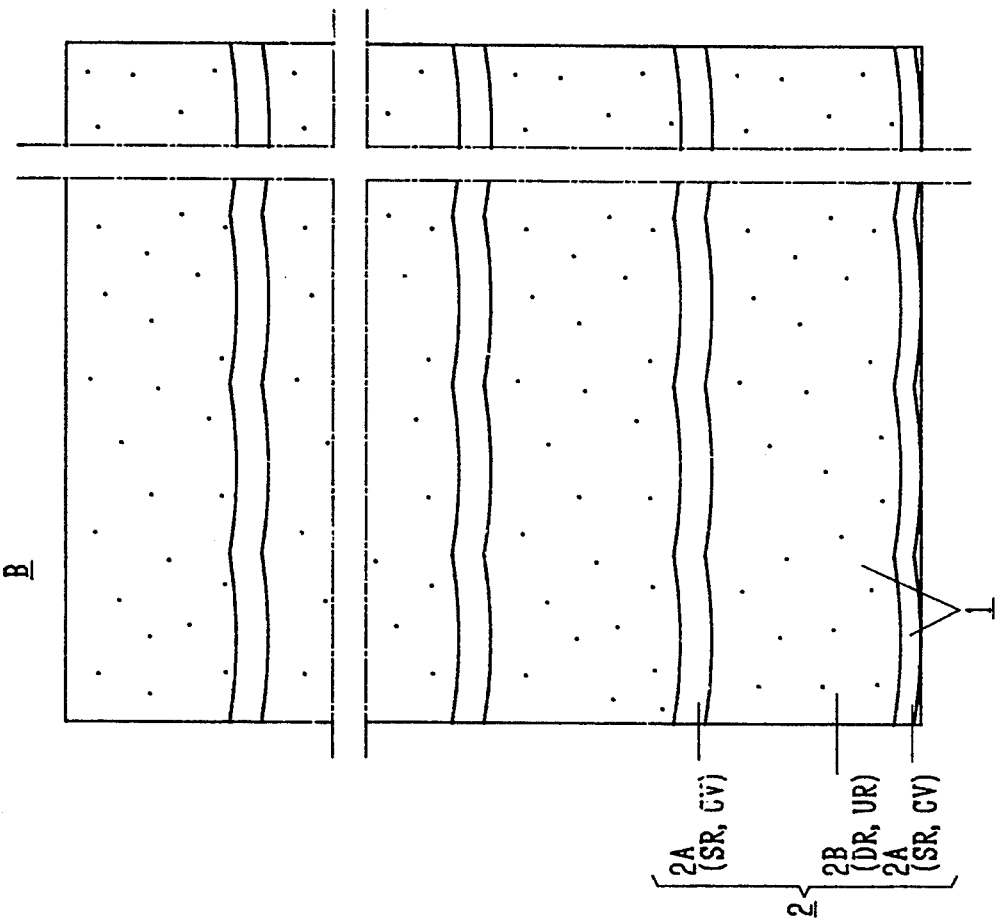
FIG. 26 is a schematic front view, partly cut away, showing the substrate depicted in FIG. 25.
Figure 25:
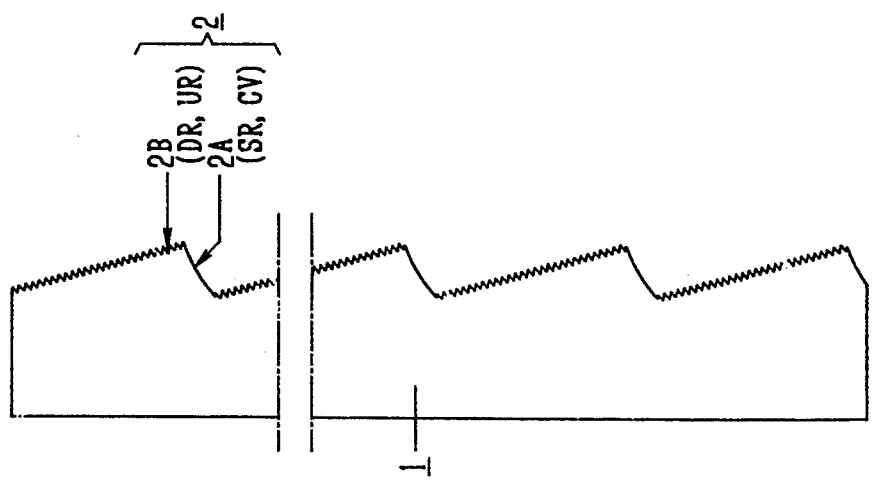
FIG. 25 is a longitudinal-sectional view schematically illustrating a fourth embodiment of the substrate according to the present invention.

Referring next to FIGS. 25 and 26, a fourth embodiment of the substrate B for the pseudo-luminous panel Q according to the present invention will be described. The parts corresponding to those in FIGS. 9 and 10 are identified by the same reference numerals and no detailed description will be given thereof.

The substrate B of this embodiment is identical in construction with the fourth embodiment of the pseudo-luminous panel Q shown in FIGS. 9 and 10 except that the thin film optical color filter 3 in the latter is omitted.

Hence, the pseudo-luminous panel Q of the present invention, described previously in conjunction with FIGS. 9 and 10, can be obtained simply by forming its thin film optical color filter 3 all over the main surface 2 of the substrate 1.

Accordingly, the use of the substrate B shown in FIGS. 25 and 26 will allow easy fabrication of the pseudo-luminous panel Q of the present invention which has the excellent effects described previously with respect to FIGS. 9 and 10.

Embodiment 13

Referring next to FIGS. 27 and 28, a fifth embodiment of the substrate B for the pseudo-luminous panel Q according to the present invention will be described. The parts corresponding to those in FIGS. 11 and 12 are identified by the same reference numerals and no detailed description will be given thereof.

The substrate B of this embodiment is identical in construction with the fifth embodiment of the pseudo-luminous panel Q shown in FIGS. 11 and 12 except that the thin film optical color filter 3 in the latter is omitted.

Hence, the pseudo-luminous panel Q of the present invention, described previously in conjunction with FIGS. 11 and 12, can be obtained simply by forming its thin film optical color filter 3 all over the surface 6 of the reflecting film 5.

Accordingly, the use of the substrate B shown in FIGS. 27 and 28 will allow easy fabrication of the pseudo-luminous panel Q of the present invention which has the excellent effects described previously with respect to FIGS. 11 and 12.

Embodiment 14

Referring next to FIGS. 29 and 30, a sixth embodiment of the substrate B for the pseudo-luminous panel Q according to the present invention will be described. The parts corresponding to those in FIGS. 13 and 14 are identified by the same reference numerals and no detailed description will be given thereof.

The substrate B of this embodiment is identical in construction with the sixth embodiment of the pseudo-luminous panel Q shown in FIGS. 13 and 14 except that the thin film optical color filter 3 in the latter is omitted.

Hence, the pseudo-luminous panel Q of the present invention, described previously in conjunction with FIGS. 13 and 14, can be obtained simply by forming its thin film optical color filter 3 all over the surface 6 of the reflecting film 5.

Accordingly, the use of the substrate B shown in FIGS. 29 and 30 will allow easy fabrication of the pseudo-luminous panel Q of the present invention which has the excellent effects described previously with respect to FIGS. 13 and 14.

Embodiment 15

Figure 32:
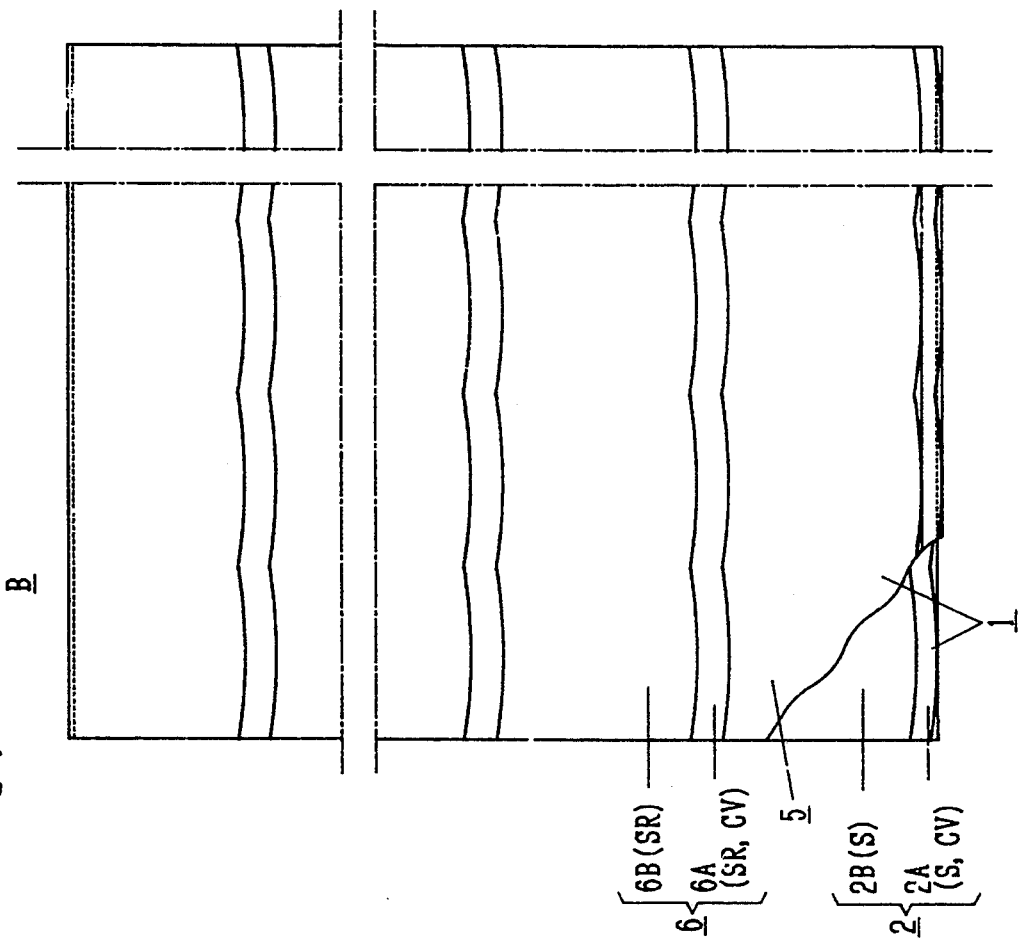
FIG. 32 is a schematic front view, partly cut away, showing the substrate depicted in FIG. 31.
Figure 31:
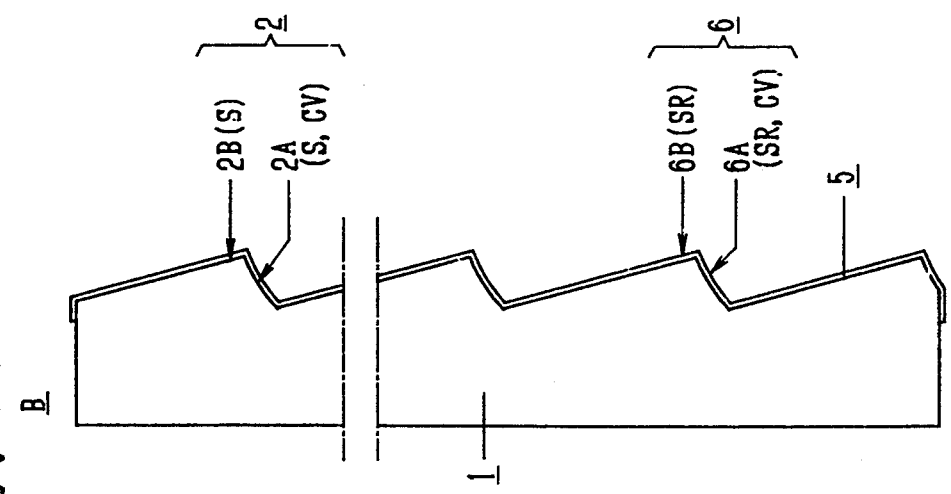
FIG. 31 is a longitudinal-sectional view schematically illustrating a seventh embodiment of the substrate according to the present invention.

Referring next to FIGS. 31 and 32, a seventh embodiment of the substrate B for the pseudo-luminous panel Q according to the present invention will be described. The parts corresponding to those in FIGS. 15 and 16 are identified by the same reference numerals and no detailed description will be given thereof.

The substrate B of this embodiment is identical in construction with the seventh embodiment of the pseudo-luminous panel Q shown in FIGS. 15 and 16 except that the thin film optical color filter 3 in the latter is omitted.

Hence, the pseudo-luminous panel Q of the present invention, described previously in conjunction with FIGS. 15 and 16, can be obtained simply by forming its thin film optical color filter 3 all over the surface 6 of the reflecting film 5.

Accordingly, the use of the substrate B shown in FIGS. 31 and 32 will allow easy fabrication of the pseudo-luminous panel Q of the present invention which has the excellent effects described previously with respect to FIGS. 15 and 16.

Embodiment 16

Figure 34:
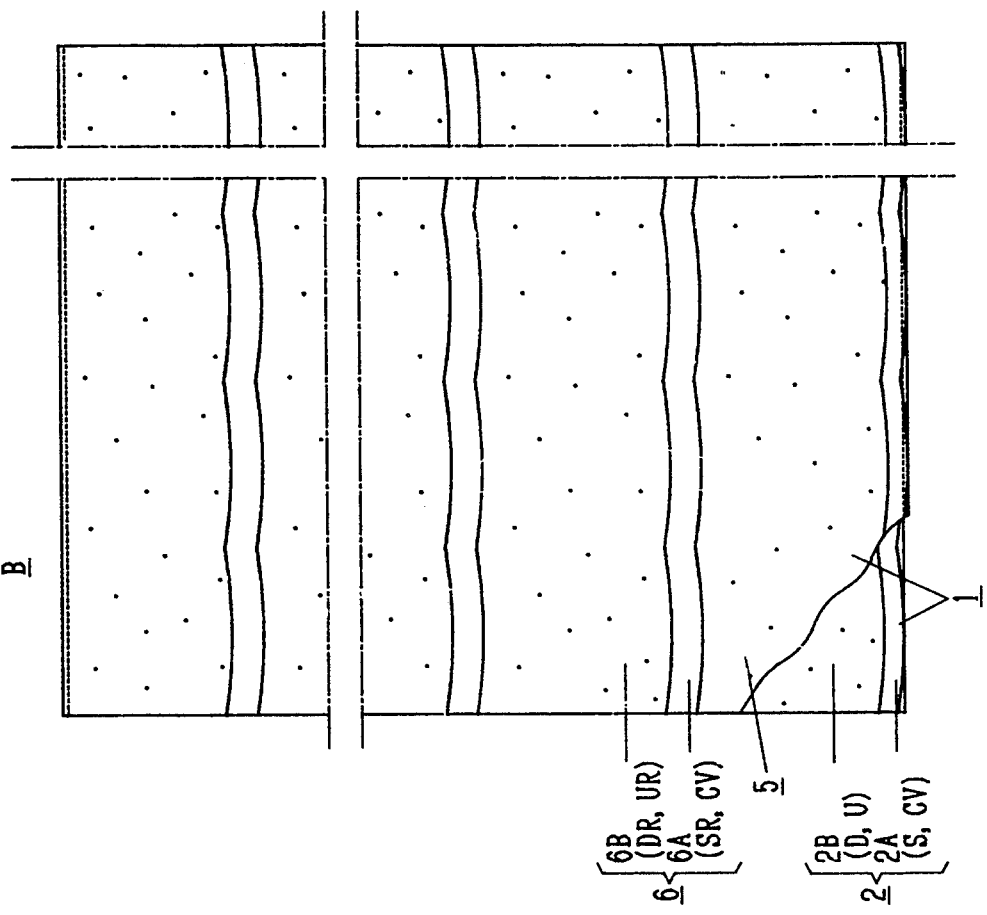
FIG. 34 is a schematic front view, partly cut away, showing the substrate depicted in FIG. 33.
Figure 33:
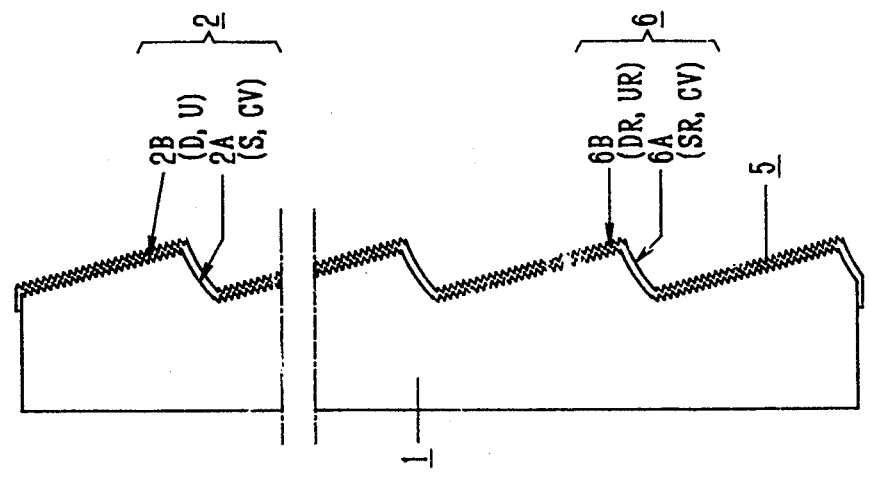
FIG. 33 is a longitudinal-sectional view schematically illustrating an eighth embodiment of the substrate according to the present invention.

Referring next to FIGS. 33 and 34, an eighth embodiment of the substrate B for the pseudo-luminous panel Q according to the present invention will be described. The parts corresponding to those in FIGS. 17 and 18 are identified by the same reference numerals and no detailed description will be given thereof.

The substrate B of this embodiment is identical in construction with the eighth embodiment of the pseudo-luminous panel Q shown in FIGS. 17 and 18 except that the thin film optical color filter 3 in the latter is omitted.

Hence, the pseudo-luminous panel Q of the present invention, described previously in conjunction with FIGS. 17 and 18, can be obtained simply by forming its thin film optical color filter 3 all over the surface 6 of the reflecting film 5.

Accordingly, the use of the substrate B shown in FIGS. 33 and 34 will allow easy fabrication of the pseudo-luminous panel Q of the present invention which has the excellent effects described previously with respect to FIGS. 17 and 18.

Embodiment 17

Figure 35:
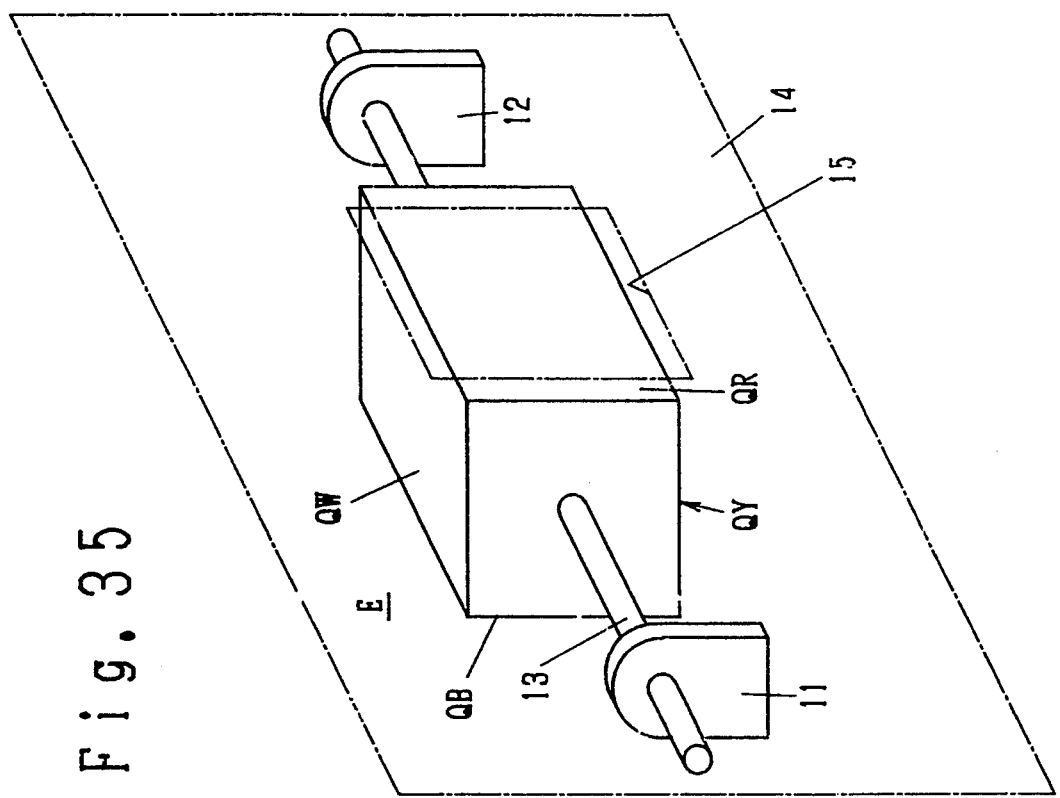
FIG. 35 is a schematic perspective view illustrating a first embodiment of the display element according to the present invention.

Turning next to FIG. 35, a first embodiment of the display element employing the pseudo-luminous panels of the present invention will be described.

The display element, denoted generally by E in FIG. 35, has a construction in which four pseudo-luminous panels QR, QY, QB and QW of any one of the first to eighth embodiments described above are disposed at 90 degrees angular intervals about a rotary shaft 13 pivotally supported at both ends by bearing 11 and 12 in such a manner as to turn by steps of 90 degrees in a forward or backward direction. In this instance, thin film optical color filters 3 of the pseudo-luminous panels QR, QY, QB and QW have difference pass bands in terms of their band-pass characteristics so that patterns of the substrates 1 are seen in different hues, for example, red, yellow, blue and white.

In this embodiment a style strip 14 having a window 15 is disposed in front of the display element E and the rotary shaft 13 is turned by suitable means by steps of 90 degrees in the forward or backward direction to selectively bring one of the pseudo-luminous panels QR, QY, QB and QW to the front just behind the window 15.

When such a display element E, combined with the style strip 14, is disposed outdoors, for example, high above the ground in the same manner as described previously in connection with the pseudo-luminous panels of the first to eighth embodiment, the pattern of that selected one of the pseudo-luminous panels QR, QY, QB and QW which has been brought to the front can be viewed through the window 15 in the hue based on the pass band of the color filter 3 of the selected pseudo-luminous panel (for example, red, yellow, blue or white) in the daytime and at night. In this instance, the excellent effects described previously in respect of the first to eighth embodiment are produced.

Hence, the display element E of this embodiment is capable of displaying patterns in different colors, as desired. Accordingly, the display element E can be applied to a traffic signal display, for example.

Embodiment 18

Figure 36:
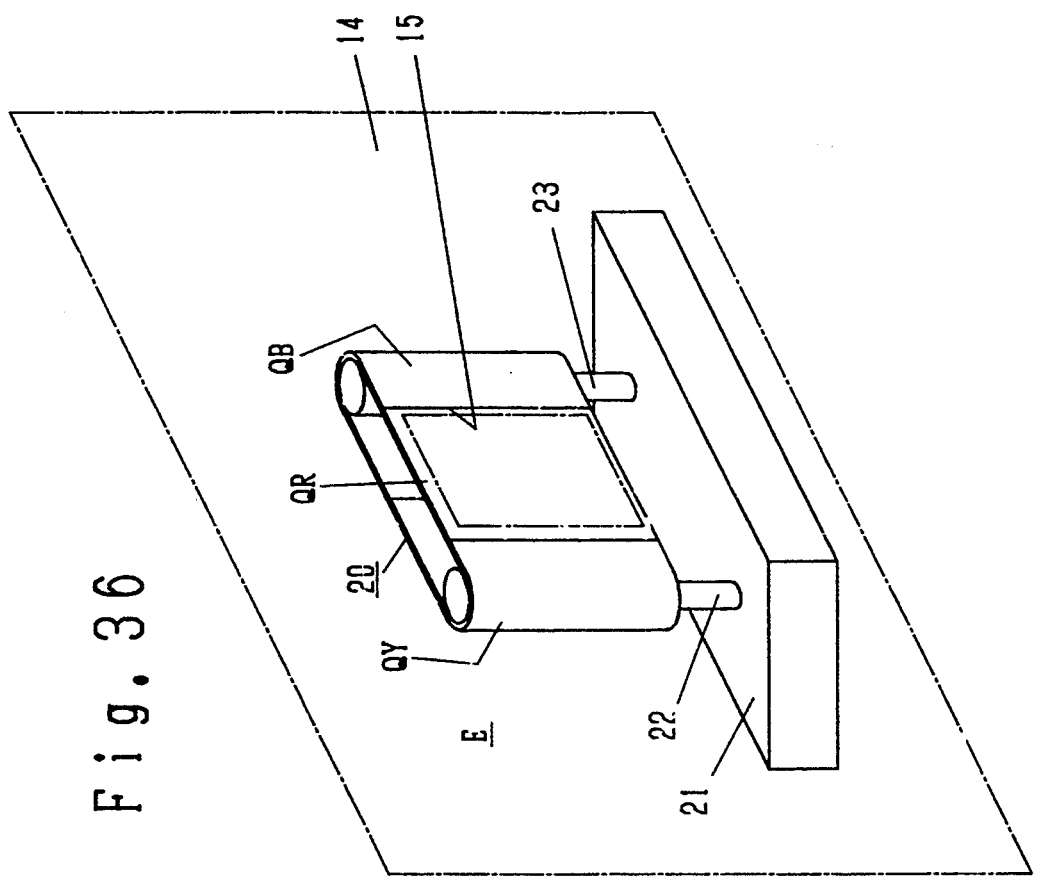
FIG. 36 is a schematic perspective view illustrating a second embodiment of the display element according to the present invention.

Turning next to FIG. 36, a second embodiment of the display element according to the present invention will be described.

The display element E of this embodiment has a construction in which three flexible pseudo-luminous panels QR, QY and QB according to any one of the aforementioned first to eighth embodiment of the present invention are sequentially arranged on an endless belt 20 or sequentially arranged to form such an endless belt 20 and belt 20 is stretched between rotary shafts 22 and 23 planted on a support 21.

In this instance, the thin film optical color filters 3 of the pseudo-luminous panels QR, QY and QB have different pass bands so that their patterns are viewed in different colors, for example, red, yellow and blue as in the first embodiment of the display element.

The style strip 14 having the window 15 is disposed in front of the display element E, and by turning the rotary shafts 22 and 23 in the forward or backward direction by suitable means, the pseudo-luminous panels QR, QY and QB can be selectively brought to the front for display through the window 15.

When the display element E of this embodiment is disposed outdoors, for example, high above the ground and the style strip 14 is placed in front of the display element E as mentioned above, the pattern of that selected one of the pseudo-luminous panels QR, QY and QB which has been brought to the front can be viewed through the window 15 in the hue based on the pass band of the color filter 3 of the selected pseudo-luminous panel (for example, red, yellow or blue) in the daytime and at night.

Thus, the display element E of this embodiment is also capable of displaying patterns in different colors and, at the same time, produces the excellent effects described previously in respect of the first to eighth embodiments of the present invention.

Accordingly, the display element E of this embodiment is also applicable to a traffic signal display, for instance.

Embodiment 19

Figure 37:
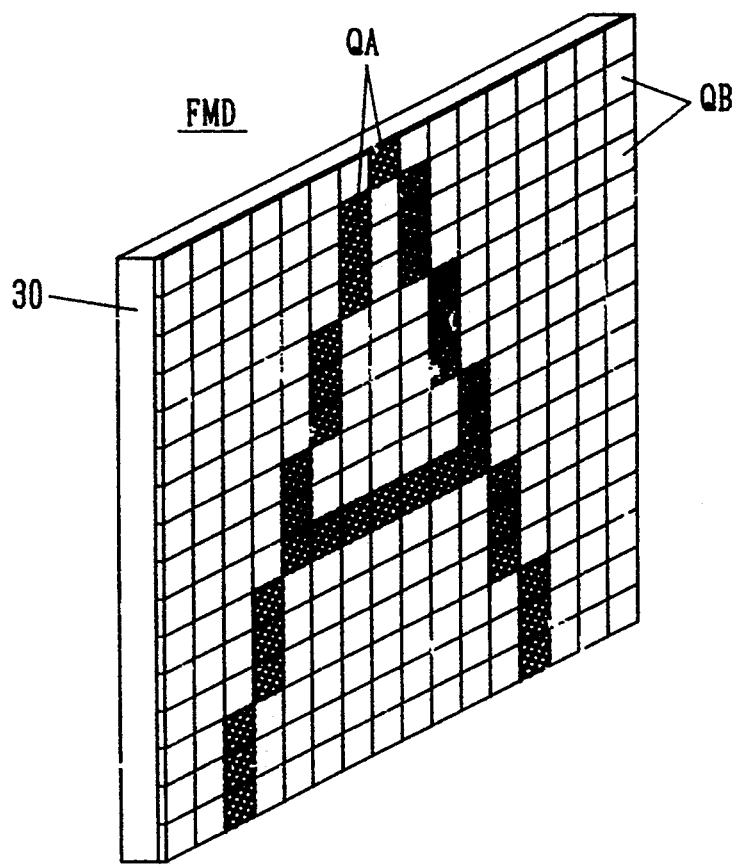
FIG. 37 is a schematic perspective view illustrating an embodiment of the fixed matrix display device according to the present invention.
Figure 38:
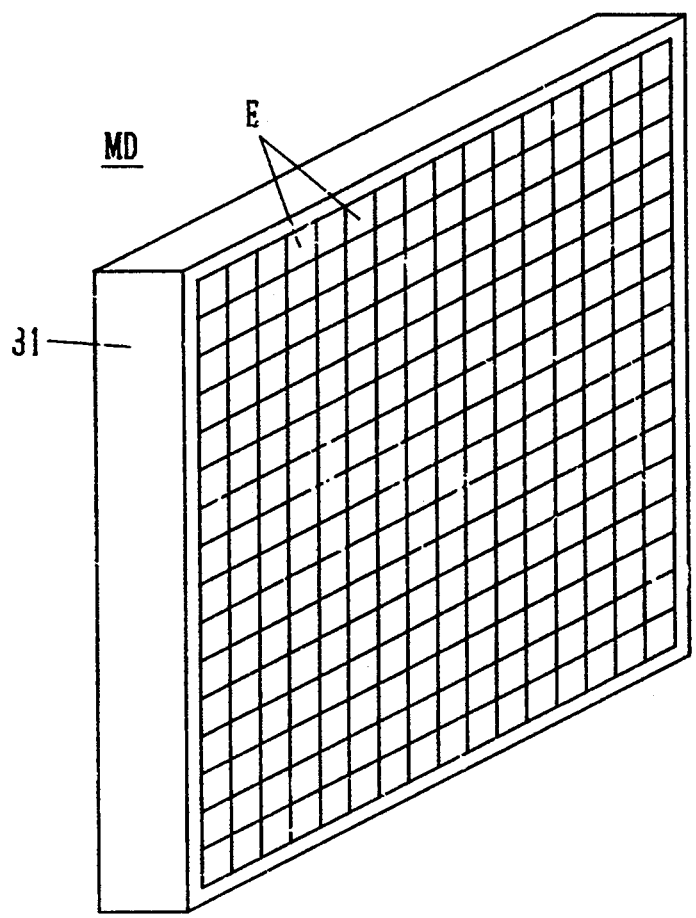
FIG. 38 is a schematic perspective view illustrating an embodiment of the matrix display device according to the present invention.
Figure 41:
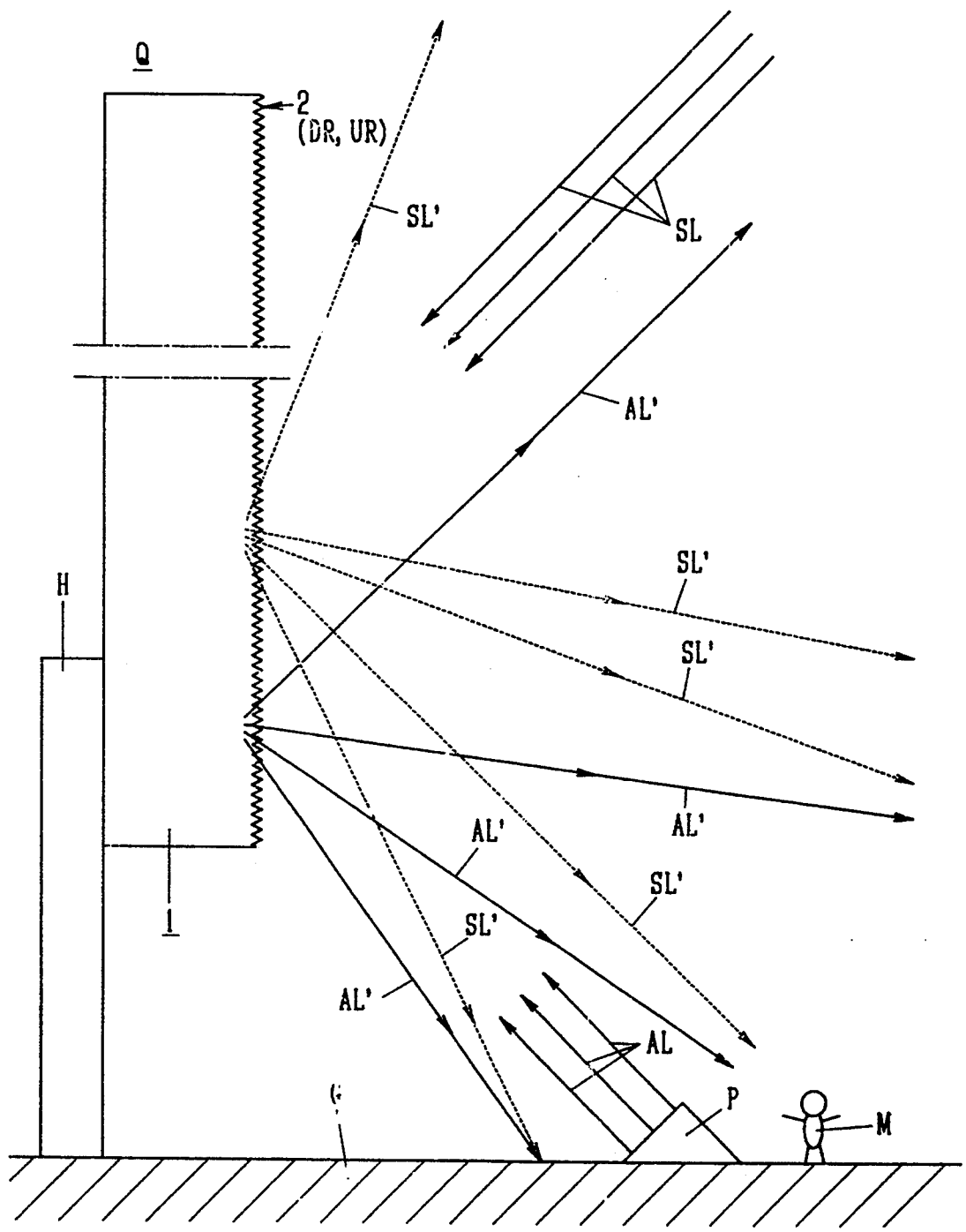
FIG. 41 is a schematic plan view of the conventional pseudo-luminous panel.

Turning next to FIG. 37, an embodiment of the fixed matrix display device employing the pseudo-luminous panels according to the present invention.

The fixed matrix display device, denoted generally by FMD in FIG. 37, has a construction in which a number of pseudo-luminous panels Q according to any one of the first to eighth embodiments are arranged in a matrix form. In this instance, thin film optical color filters 3 of the pseudo-luminous panels (indicated by QB) except those QA each have a pass band in its band-pass characteristic for blue color, for example, and the thin film optical color filters 3 of the other pseudo-luminous panels QA each have a pass band in its band-pass characteristic for red color, for instance. The pseudo-luminous panels Q are arranged so that the pseudo-luminous panels QA form a pattern of a character, for example, "A".

When such a fixed matrix display device FMD installed outdoors, for example, high above the ground, the pattern of the character "A" can be displayed in the hue (red) based on the pass band of the color filter 3 of each pseudo-luminous panel QA in the daytime and at night.

Thus, the fixed matrix display device FMD of this embodiment can be employed for advertisement, for instance.

Embodiment 20

Turning next to FIG. 37, an embodiment of the matrix display device employing the display element according to the present invention will be described.

The matrix display device MD of this embodiment has a construction in which a number of display elements E according to the seventeenth or eighteenth embodiment shown in FIG. 35 or 36 are arranged in a matrix form.

According to the matrix display device MD of this embodiment, since each display element E is capable of changing the color of its display as mentioned above, a character, figure or like pattern can be displayed in a desired color in the daytime and at night.

The embodiments described above are merely illustrative of the present invention and should not be construed as limiting the invention specifically thereto. In each embodiment the obliquely downward band-like surface portions 2A of the substrate 2 can also be formed by smooth surfaces extending straight in the longitudinal section of the panel Q, and in the embodiments employing the reflecting film 5 its obliquely downward band-like surface portions 6A can also be formed by smooth reflecting surfaces extending straight in the longitudinal section of the panel Q.

Moreover, in the sixth embodiment of FIGS. 13 and 14 and the eighth embodiment of FIGS. 17 and 18 the obliquely upward band-like surface portions 2B of the substrate 1 can also be formed by smooth surfaces in the longitudinal section of the panel Q.

It will be apparent that many modifications and variations may be effected without departing from the scope of the novel concepts of the present invention.

What is claimed is:

1. A pseudo-luminous panel comprising:
a substrate; and
a thin film optical color filter formed all over the main surface of said substrate;
wherein:
said main surface of said substrate is formed by a surface in which obliquely downward band-like surface portions and obliquely upward band-like surface portions are alternately arranged side by side in a vertical direction;
said obliquely downward band-like surface portions forming said main surface of said substrate are each a smooth reflecting surface;
said obliquely upward band-like surface portions forming said main surface of said substrate are each a reflecting surface;
obliquely downward band-like surface portions of said thin film optical color filter on said obliquely downward band-like surface portions of said substrate, forming the surface of said thin film optical color filter on the opposite side from said substrate, are each a smooth surface extending straight in a longitudinal section of said panel; and
obliquely upward band-like surface portions of said thin film optical color filter on said obliquely upward band-like surface portions of said substrate, forming the surface of said thin optical color filter on the opposite side from said substrate, are each a rough surface.

2. A pseudo-luminous panel comprising:
a substrate; and
a thin film optical color filter formed all over the main surface of said substrate;
wherein:
said main surface of said substrate is formed by a surface in which obliquely downward band-like surface portions and obliquely upward band-like surface portions are alternately arranged side by side in a vertical direction;
said obliquely downward band-like surface portions forming said main surface of said substrate are each a smooth reflecting surface concave in a longitudinal section of said panel;
said obliquely upward band-like surface portions forming said main surface of said substrate are each a reflecting surface;
obliquely downward band-like surface portions of said thin film optical color filter on said obliquely downward band-like surface portions of said substrate, forming the surface of said thin film optical color filter on the opposite side from said substrate, are each a smooth surface extending straight in the longitudinal section of said panel; and
obliquely upward band-like surface portions of said thin film optical color filter on said obliquely upward band-like surface portions of said substrate, forming the surface of said thin film optical color filter on the opposite side from said substrate, are each a rough surface.

3. The pseudo-luminous panel of claim 1 or 2 wherein said obliquely downward band-like surface portions forming said main surface of said substrate are each a surface which extends straight widthwise of said panel.

4. The pseudo-luminous panel of claim 1 or 2 wherein said obliquely downward band-like surface portions forming said main surface of said substrate are each a surface which is convex downward at regular intervals widthwise of said panel.

5. A pseudo-luminous panel comprising:
a substrate;
a reflecting film formed all over the main surface of said substrate; and
a thin film optical color filter formed on the surface of said reflecting film on the opposite side from said substrate;
wherein:
said main surface of said substrate is formed by a surface in which obliquely downward band-like surface portions and obliquely upward band-like surface portions are alternately arranged side by side in a vertical direction,
obliquely downward band-like surface portions of said reflecting film on said obliquely downward band-like surface portions of said substrate, forming the surface of said reflecting film on the opposite side from said substrate, are each a smooth reflecting surface;

obliquely upward band-like surface portions of said reflecting film on said obliquely upward band-like surface portions of said substrate, forming the surface of said reflecting film on the opposite side from said substrate, are each a reflecting surface;

obliquely downward band-like surface portions of said thin film optical color filter on said obliquely downward band-like surface portions of said reflecting film, forming the surface of said thin film optical color filter on the opposite side from said reflecting film, are each a smooth surface extending straight in a longitudinal section of said panel; and obliquely upward band-like surface portions of said thin film optical color filter on said obliquely upward band-like surface portions of said reflecting film, forming the surface of said thin film optical color filter on the opposite side from said reflecting film, are each a rough surface.

6. A pseudo-luminous panel comprising:

a substrate;

a reflecting film formed all over the main surface of said substrate; and a thin film optical color filter formed all over the surface of said reflecting film on the opposite side from said substrate;

wherein:

said main surface of said substrate is formed by a surface in which obliquely downward band-like surface portions and obliquely upward band-like surface portions are alternately arranged side by side in a vertical direction;

obliquely downward band-like surface portions of said reflecting film on said obliquely downward band-like surface portions of said substrate, forming the surface of said reflecting film on the opposite side from said substrate, are each a smooth reflecting surface which is concave in a longitudinal section of said panel;

obliquely upward band-like surface portions of said reflecting film on said obliquely upward band-like surface portions of said substrate, forming the surface of said reflecting film on the opposite side from said substrate are each a reflecting surface;

obliquely downward band-like surface portions of said thin film optical color filter on said obliquely downward band-like surface portions of said reflecting film, forming the surface of said thin film optical color filter on the opposite side from said reflecting film, are each a smooth surface extending straight in a longitudinal section of said panel; and obliquely upward band-like surface portions of said thin film optical color filter on said obliquely upward band-like surface portions of said reflecting film, forming the surface of said thin film optical color filter on the opposite side from said reflecting film, are each a rough surface.

7. The pseudo-luminous panel of claim 5 or 6 wherein said obliquely downward band-like surface portions forming said surface of said reflecting film are each a surface which extends straight widthwise of said panel.

8. The pseudo-luminous panel of said 5 or 6 wherein said obliquely downward band-like surface portions forming said surface of said reflecting film are each a surface which is convex downward at regular intervals widthwise of said panel.

9. The pseudo-luminous panel of claim 1, 2, 5, or 6 wherein said substrate is flexible.

10. A display element comprising:

a plurality of pseudo-luminous panels of claim 1, 2, 5, or 6;

wherein:

said plurality of pseudo-luminous panels are arranged on a support so that they are selectively displayed; and thin film optical color filters of said pseudo-luminous panels have different pass bands in terms of their band-pass characteristic.

11. A fixed matrix display device comprising:

plurality of pseudo-luminous panels of claim 1, 2, 5, or 6;

wherein:

said plurality of pseudo-luminous panels are arranged in a matrix form on a support.

12. A matrix display device comprising:

a number of display elements arranged in a matrix form on a support;

wherein:

each of said display elements has a plurality of pseudo-luminous panels of claim 1, 2, 5, or 6;

said plurality of pseudo-luminous panels are arranged on a support so that they are selectively displayed; and thin film optical color filters of said plurality of pseudo-luminous panels have different pass bands in terms of their band-pass characteristic.

13. A substrate for a pseudo-luminous panel wherein:

said substrate has its main surface formed by a surface in which obliquely downward band-like surface portions and obliquely upward band-like surface portions are alternately arranged side by side in a vertical direction;

said obliquely downward band-like surface portions are each a smooth reflecting surface which is concave in the longitudinal section of said panel; and said obliquely upward band-like surface potions of said substrate are each a reflecting surface.

14. A substrate for a pseudo-luminous panel which includes a reflecting film formed all over the main surface of said substrate and wherein:

said main surface of said substrate is formed by a surface in which obliquely downward band-like surface portions and obliquely upward band-like surface portions are alternately arranged side by side in a vertical direction;

obliquely downward band-like surface portions of said reflecting film on said obliquely downward band-like surface portions of said substrate, forming the surface of said reflecting film on the opposite side from said substrate, are each a smooth reflecting surface which are concave in the longitudinal section of said panel; and obliquely upward band-like surface portions of said reflecting film on said obliquely upward band-like surface portions of said substrate, forming the surface of said reflecting film on the opposite side from said substrate, are each a reflecting surface.

15. The substrate of claim 13 wherein said obliquely downward band-like surface portions forming said main surface of said substrate are each a surface which is convex downward at regular intervals widthwise of said substrate.

16. The substrate of claim 13 which is flexible.

17. The substrate of claim 14 wherein said obliquely downward band-like surface potions forming the surface of said reflecting film are each a surface extending straight in the cross-section of said panel.

18. The substrate of claim 14 wherein said obliquely downward band-like surface portions forming the surface of said reflecting film are each a surface which is convex downward at regular intervals widthwise of said panel.

19. The substrate of claim 14 which is flexible.

* * * * *